(12) United States Patent
Zinevitch

(10) Patent No.: US 7,584,496 B2
(45) Date of Patent: Sep. 1, 2009

(54) METHOD AND APPARATUS FOR PINPOINTING COMMON PATH DISTORTION

(75) Inventor: Victor M. Zinevitch, Voronezh (RU)

(73) Assignee: Arcom Digital, LLC, Syracuse, NY (US)

( * ) Notice: Subject to any disclaimer, the term of this patent is extended or adjusted under 35 U.S.C. 154(b) by 365 days.

(21) Appl. No.: 11/324,641

(22) Filed: Jan. 3, 2006

(65) Prior Publication Data

US 2006/0248564 A1  Nov. 2, 2006

Related U.S. Application Data

(60) Provisional application No. 60/727,931, filed on Oct. 18, 2005, provisional application No. 60/655,191, filed on Feb. 22, 2005.

(51) Int. Cl.
*H04N 7/173* (2006.01)
*H04N 17/00* (2006.01)

(52) U.S. Cl. ............... 725/107; 725/124; 348/192; 702/59

(58) Field of Classification Search ............ 725/107, 725/124; 348/192; 702/59
See application file for complete search history.

(56) References Cited

U.S. PATENT DOCUMENTS

| | | | |
|---|---|---|---|
| 5,073,822 | A | 12/1991 | Gumm et al. |
| 5,461,318 | A | 10/1995 | Borchert et al. |
| 5,617,137 | A | 4/1997 | Whitlow |
| 5,682,100 | A | 10/1997 | Rossi et al. |
| 5,990,687 | A | 11/1999 | Williams |
| 6,140,822 | A | 10/2000 | Williams |
| 6,151,559 | A | 11/2000 | Williams |
| 6,344,749 | B1 | 2/2002 | Williams |
| 6,417,942 | B1 | 7/2002 | Seto et al. |

(Continued)

FOREIGN PATENT DOCUMENTS

EP  0 487 306 A2  5/1992

(Continued)

OTHER PUBLICATIONS

International Search Report in PCT/US2006/006360 (WO 2006/091708) [This is PCT counterpart to present application]; Date Oct. 2, 2006; pp. 2-3 & 5-6.

(Continued)

*Primary Examiner*—James Sheleheda
(74) *Attorney, Agent, or Firm*—Lawrence P. Trapani, Esq.

(57) ABSTRACT

A system for pinpointing CDP sources in a two-way HFC CATV network comprises a headend CPD radar unit, a return path switch, and a computer. The radar unit is coupled to a headend combiner. The return path switch is coupled between the nodes of the CATV network and the radar unit. The computer is connected to the radar unit and the return path switch. The computer controls the radar unit and switch and causes them to perform constant sequential CPD monitoring of the nodes of the network. The system further comprises a portable radar-calibrator unit that is carried into the field and connected to various points along the coaxial cable portion of the network. The portable radar unit is used to detect CPD sources in the field and to calibrate the network as to time delay. The portable unit communicates with the headend radar unit through the CATV network.

17 Claims, 14 Drawing Sheets

U.S. PATENT DOCUMENTS

| | | | |
|---|---|---|---|
| 6,425,132 B1* | 7/2002 | Chappell | 725/107 |
| 6,570,394 B1 | 5/2003 | Williams | |
| 6,687,632 B1 | 2/2004 | Rittman | |
| 6,934,655 B2* | 8/2005 | Jones et al. | 702/108 |
| 7,024,680 B2 | 4/2006 | Howard | |
| 7,069,163 B2 | 6/2006 | Gunther et al. | |
| 7,415,367 B2 | 8/2008 | Williams | |
| 7,451,472 B2 | 11/2008 | Williams | |
| 2003/0142622 A1* | 7/2003 | Kaku et al. | 370/208 |
| 2004/0091055 A1 | 5/2004 | Williams | |
| 2004/0245995 A1* | 12/2004 | Williams | 324/512 |
| 2006/0012376 A1 | 1/2006 | Furse et al. | |

FOREIGN PATENT DOCUMENTS

| | | | |
|---|---|---|---|
| WO | WO 97/20196 A1 | | 6/1997 |
| WO | WO 00/57571 A1 | | 9/2000 |
| WO | WO 0057571 A1 | * | 9/2000 |
| WO | WO 2004/070398 A2 | | 8/2004 |

OTHER PUBLICATIONS

Written Opinion of the International Searching Authority in PCT/US2006/006360 (WO 2006/091708) [This is PCT counterpart to present application]; Date Oct. 2, 2006; pp. 3-21.

Patel, Bharat, Common Path Distortions Explained, article, Oct. 13, 1998, pp. 1-2, 5-9, 16-18, 22-23, 27-28, SCTE, http://chapters.scte.org/newengland/reference/CPD/CPD2.htm.

Moran, Jack, RF Impairments in the Return Path & Their Impact on a DOCSIS Performance or The RF World According to Jack, Powerpoint Presentation, dated Sep. 23, 2004, and revised Jan. 13, 2004; pp. 2, 4-5, 10-13, 37-54; SCTE Proceedings.

Lee, Edward A. & Messerschmitt, David G., Digital Communication, Second Edition, reference book, 1994, pp. 231-234, Kluwer Academic Publishers, Norwell, MA.

Zhang, Yun Hong & Jennings, Len, DSP Applications in Range Finding, article, Jan. 1, 2002, pp. 61-66, New Zeeland, http://www.manukau.ac.nz/departments/e_e/research/2002/yz.pdf.

Williams, Thomas H., et al., Results of Return Plant Testing, Symposium, Jun. 1997, pp. 142-165, 1997 NCTA Technical Papers.

Williams, Thomas Holtzman, Cable Scope® Instruction Manual, 1998-2003, pp. 1-10, 13-15, 20-22, 24-30, Holtzman Inc., Longmont, CO.

Williams, Thomas Holtzman, Return Path Linear Distortion and its Effect on Data Transmissions, Symposium, Jun. 2000, pp. 54-71, 2000 NCTA Technical Papers.

Williams, Thomas Holtzman, Proofing and Maintaining Upstream Cable Plant With Digital Signal Analysis Techniques, 49th ARFTG Conference Digest, Jun. 13, 1997, pp. 7-18.

* cited by examiner

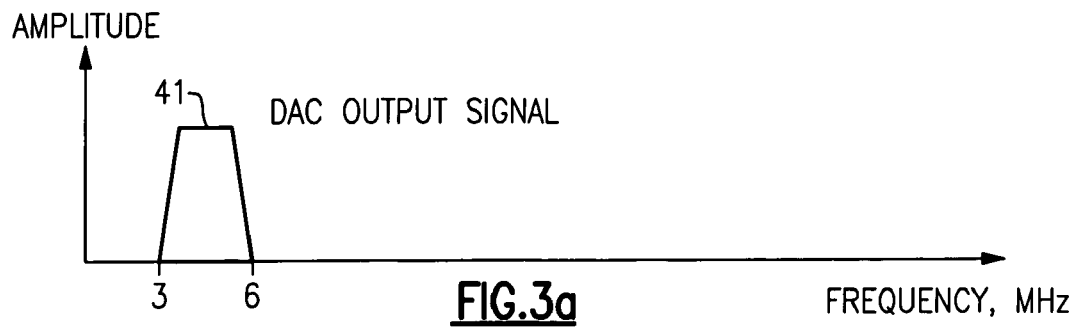
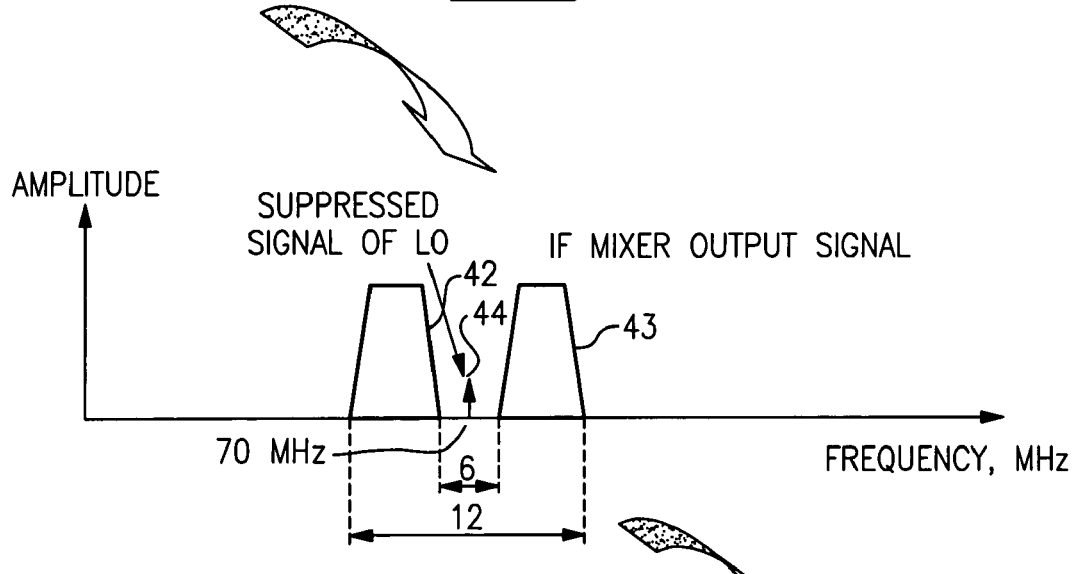
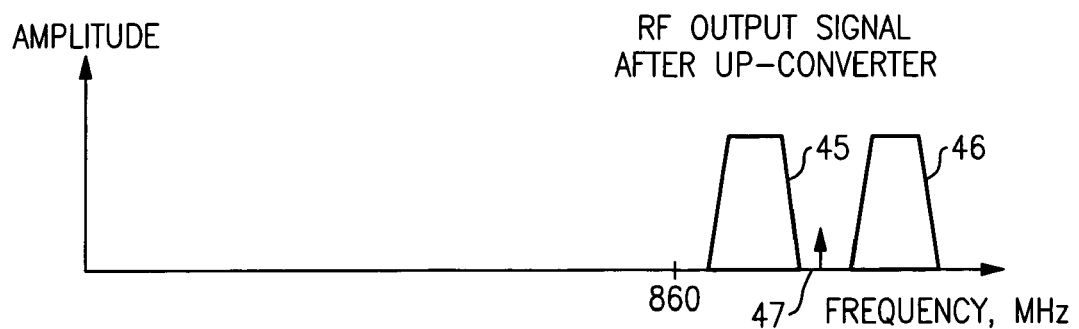

METHOD AND APPARATUS FOR PINPOINTING COMMON PATH DISTORTION

CROSS-REFERENCE TO RELATED APPLICATIONS

This application claims the benefit of U.S. Provisional Application No. 60/655,191, filed Feb. 22, 2005, and U.S. Provisional Application No. 60/727,931, filed Oct. 18, 2005.

BACKGROUND OF THE INVENTION

The present invention relates generally to CATV network monitoring systems, and more particularly to methods and apparatus for pinpointing sources of common path distortion (CPD) or passive intermodulation distortion (PIM) in a two-way broad band hybrid fiber-coax (HFC) network.

One form of distortion in a modern two-way HFC CATV network is common path distortion (CPD). This distortion is the result of intermodulation of forward path (or down stream) signals at components in the common path like connectors, taps, terminations, etc. due to the "diode effect" caused by corrosion (see article "Common Path Distortions Explained, Bharat Patel, www.scte.org/chapters/newenland/-reference/cpd/cpd2htm). CPD produces composite triple beat (CTB) and composite second order (CSO) distortion products in both the return and forward paths of the HFC network. Additionally, the locations of CPD sources are often locations where noise is introduced into the CATV network. As shown in a presentation entitled, "RF Impairments in the Return Path & Their Impact on a DOCSIS Performance or the RF World according to Jack," Jack Moran, Motorola, dated Sep. 23, 2003, CPD influence is one of the most important problems in return path service. In the forward path, CPD distortion products from the analog channels (e.g., in the range 50-550 MHz) produce degradation of the digital channels (e.g., in the range 550-860 MHz).

In view of the above, the problem of eliminating CPD is extremely important for modern HFC CATV networks. The challenge is to locate CPD sources among hundreds and sometimes thousands of nodes and miles of network cable.

There is a known system for detecting CPD sources in an HFC CATV network, described in International Application No. PCT/AU00/00235 from Mar. 24, 1999, International Publication No. WO00/57571, published on Sep. 28, 2000, by Rodney Eastment. This application discloses a method and apparatus for determining the time delay of a probing signal propagating between a CPD source and a headend station, and for determining the location of the CPD source based on the time delay and with the use of a cable network map and schematic diagrams ("Eastment System").

A drawback of the Eastment System is that the probing signal has double sidebands separated by 59.5 MHz in the forward path (down stream) spectrum. In addition, the type of probing signal—a double sideband chirp pulse signal—requires that the sidebands be located in unoccupied portions of the forward path to avoid interference with the TV program signals. Thus, the probing signal in the Eastment System requires two unoccupied TV channels in the forward path spectrum. In a modern HFC CATV system, channel spectrum is very limited and valuable. It is a potential revenue source. If the Eastment System were employed to monitor continuously CPD in the network, two useful channels in the forward path would be lost, assuming that they are even available.

A second drawback of the Eastment System is that it relies solely on a double sideband probing signal. As a result, the bandwidth of the CPD signal generated in response to the probing signal (i.e., "echo signal") will be limited. In Eastment, the echo signal is a second order intermodulation (difference) product of the probing signal, received at the headend in the return path spectrum (e.g., 5-50 MHz). The bandwidth of this signal is proportional to the resolution of the range that can be determined from this signal. That is, a wider bandwidth translates to a higher resolution. The bandwidth of Eastment's echo signal is 5 MHz. This bandwidth provides a target resolution of about 100 feet. In many instances, this resolution is not sufficient, considering that there could be many network devices (each being a potential CPD source) located within this span. Improved resolution is desired in order to reduce or eliminate ambiguity as to the identity of the source device.

An attempt to increase the bandwidth of the echo signal, to improve resolution, will be necessarily constrained by the resulting increase in bandwidth required for the corresponding probing signal in the forward path spectrum. This is especially so if the goal is to place the probing signal in the roll-off region of the forward path spectrum, to avoid interference. Thus, a system that relies solely on a double sideband chirp signal will have limited target resolution.

Another constraint on the bandwidth of the Eastment echo signal is the requirement that the signal be place in an unoccupied portion of the return path spectrum. This is a requirement because the presence of typical return path service signals, such as Internet and telephony, create an environment where it is difficult to distinguish the echo signal from the actual network traffic, or at least more so than in an unoccupied spectrum. Like the forward path, the return path spectrum has become crowded with the advent of Internet and telephone service. Thus, return bandwidth is valuable. Furthermore, in most cases, the only unoccupied portion of the return spectrum is at the lower frequencies, i.e., in the 5-15 MHz region. However, in this region, ingress noise and pulse noise are most common, making it difficult here as well to reliably detect and process the echo signal.

Another drawback of the Eastment System is that it relies solely on the second order difference product of a probing signal to detect CPD. In the Patel article, "Common Path Distortions Explained, it is suggested that the third order intermodulation products (caused by CPD) may be important for detection of CPD. In fact, the Patel article suggests that, in some cases, the third order products are more dominant than the second order products and, in other cases, are the only distortion products appearing from a CPD source. Further, it is known that the voltage-current response of a CPD source—a metal/oxide/metal junction due to oxidation ("diode effect")—can be mathematically described with a polynomial of the third order. This analysis suggests that the third order products are likely to be more dominant than the second order products. Thus, a system that relies on both second and third order products is likely to detect CPD more reliably, especially in a typically noisy return path environment.

As pointed out in the Patel article, the appearance of CPD in the network may vary from night to day (probably due to temperature variations), may vary due to temperature variations in general, or may vary as a result of other factors. Generally, the Eastment System has been employed to respond to a CPD problem or to perform routine maintenance. Such efforts have overlooked the need to monitor the CPD environment over a longer period of time to ensure that all of the CPD sources are detected. Ideally, the network should be constantly monitored. With a system such as the Eastment System, however, this requirement would impose a substantial demand on technical personnel and other resources, and thus would be a costly proposition.

The coaxial cable portion of an HFC network has generally followed a tree-and-branch architecture. If a CPD source is located in a particular branch among multiple parallel branches, it may be difficult to resolve which branch it is located based solely on a range determination ("range ambiguity"). It is suggested in the Eastment application that such CPD sources can be located if the ranging resolution is high enough to determine whether the range would put the source at mid-span (between utility poles). If so, then that particular branch would be eliminated from consideration, because it is assumed that CPD sources do not usually occur at mid-span. This approach may be theoretically sound; however, it is dependent not only on resolution, but also on the accuracy of cable plant maps and/or schematics. Such maps or schematics are generally not accurate. The distance between cable plant devices and cable lengths are usually specified with a certain error. In many cases, the actual lengths of cable are not specified and only the distance between utility poles may be given. Further, the maps may not specify actual velocities of propagation of the cables in the network, and the maps may not reflect changes to the network over time. Thus, even with a very high resolution system, this approach may not succeed in practice, without accurate calibration.

In view of the short comings of standard cable plant maps, it is a necessity to go into the field and calibrate the network. This generally involves the transmission of a calibration signal from a calibration point in the network to the headend. There is a possibility that the calibration signal will be distorted or masked by an echo signal from a real CPD source located near the point of calibration. The Eastment application attempts to address this problem by proposing to shift the calibration signal in "phase time" from the actual CPD echo signal, to separate the two signals. This approach does not cancel out the CPD echo signal. Thus, the potential remains for interference between the CPD echo signal and the calibration signal. Such interference may lead to errors in calibration and, accordingly, errors in subsequent CPD range measurements.

Calibration of the network has generally required the use of technicians at two locations—the headend and the point of calibration. This process is time-consuming because it requires the coordination and communication of technicians at both sites. There is a greater chance of human error with multiple technicians performing the calibration than with one. In addition, there is the expense of employing multiple technicians for the calibration. Moreover, this approach ties up technicians that could be assigned to other maintenance tasks. Further, if other technicians are deployed to work in parallel on the CPD problem, they are left waiting for access to the system while a time-consuming calibration is performed.

OBJECTS AND SUMMARY OF THE INVENTION

It is therefore an object of the present invention to provide methods and apparatus for pinpointing CPD sources in a two-way HFC CATV network that overcomes the problems associated with the prior art.

It is another object of the present invention to provide methods and apparatus that can pinpoint CPD sources more accurately and reliably than previous methods and apparatus.

It is a further object of the present invention to provide methods and apparatus that automatically and constantly monitor a two-way HFC CATV network for CPD sources.

It is a still another object of the present invention to provide methods and apparatus for pinpointing CPD sources that do not require the injection of a probing signal into the forward path spectrum of the two-way HFC CATV network.

It is still a further object of the present invention to use existing forward path TV program signals as a CPD probing signal and to process intermodulation products of such TV program signals as a CPD echo signal.

It is yet another object of the present invention to minimize the need to use unoccupied forward path spectrum in embodiments of the invention where a probing signal is injected into the forward path.

It is yet a further object of the present invention to provide methods and apparatus for pinpointing CPD sources that are not limited to the use of narrow band CPD echo signals, but can employ wideband echo signals and thus achieve improved target resolution.

It is still yet another object of the present invention to increase CPD detection sensitivity by processing an integrated spectrum of CPD distortion products that includes both second and third order products.

It is still yet a further object of the present invention to provide methods and apparatus for pinpointing CPD sources wherein the CPD echo signal is not constrained to an unoccupied portion of the return path spectrum.

It is another object of the present invention to provide methods and apparatus for pinpointing CPD sources that can resolve CPD range ambiguities among branches in a cable network.

It is a further object of the present invention to provide methods and apparatus for calibrating a HFC CATV network using a calibration signal that is detected without interference from a CPD echo signal near the point of calibration.

It is another object of the present invention to carry out a calibration of a HFC CATV network at the point of calibration without human intervention at the headend.

These and other objects are attained in accordance with the present invention wherein there is provided a system for pinpointing CDP sources in a two-way HFC CATV network, comprising; (a) a headend CPD radar unit coupled to a headend combiner; (b) a return path switch coupled between the nodes of the CATV network and the headend radar unit; and (c) a headend computer for controlling the headend radar unit and return path switch, for constant sequential CPD monitoring of the nodes of the network.

The system further comprises a portable radar-calibrator unit that is carried into the field and connected to various points along the coaxial cable portion of the CATV network, for field detection of CPD sources and for calibrating the CATV network as to time delay. The portable radar-calibrator unit communicates with the headend radar unit through the CATV network. CPD detection and calibration information of the headend radar unit can be viewed in the field at the portable radar-calibrator unit.

The headend radar unit utilizes the existing forward path TV program signals as a CPD probing signal. Distortion products from these forward path signals, created by CPD sources, are received in the return path and processed to determine the propagation time delay from the headend to the CPD source and back again to the headend. This method is referred to as the precision CPD detection step. The distortion products are treated as a composite noise signal. The cross-correlation of this noise signal with a locally generated reference signal provides the time delay and amplitude of the CPD sources. An adaptive filter may be employed to suppress the usual return path service signals (e.g., Internet and telephony) before cross-correlation processing of the composite noise signal is performed.

A preliminary CPD detection step may be performed just before the composite noise signal is processed. This preliminary step involves the injection of a double sideband chirp probing signal into the forward path and detection in the return path of CPD echo chirp signals. The echo chirp signals are the second order intermodulation (difference) product of the probing signal. The echo chirp signals are "de-chirped" using a locally generated reference signal, and the de-chirped signal is coherently accumulated and then Fast Fourier Transformed to determine an approximate time delay for the CPD sources. This approximate time delay may be used in the precision CPD detection step, where it aids in focusing the cross-correlation process. The use of the approximate time delay in the cross-correlation process reduces the complexity and processing time of the correlator. Of course, the preliminary step is not limited to the use of chirp probing signals.

The portable radar-calibrator unit performs a final CPD detection step in the field. The unit can be connected to the coaxial cable portion of the network at any accessible point. The unit receives in the forward path a probing signal from the headend radar unit. It generates a reference signal from the probing signal. It receives in the return path the CPD echo signal which is a second order intermodulation (difference) product of the probing signal. It mixes the locally generated reference signal with the echo signal to produce a difference signal. The difference signal is Fast Fourier Transformed and the time delay of the CPD source is determined. The portable unit can yield excellent results because it can be located close to the CPD source. In addition, the return path spectrum, at the point of connection, is generally less noisy than at the headend.

The portable radar-calibrator unit is also used to calibrate the HFC network out in the field. It is connected to the network at various calibration points, which may include the fiber node, an amplifier near the end of the cable plant, and an amplifier midway between the node and the end of the cable plant. At each calibration point, the portable radar-calibrator unit generates a calibration signal from a probing signal transmitted from the headend in the forward path. The calibration signal is actually the second order difference product of the probing signal and is essentially a replica of the echo signal expected from a CPD source. However, the calibration signal is altered so that it is distinguishable from a CPD echo signal. The calibration signal is transmitted in the return path to the headend radar unit where it undergoes processing similar to that described for the preliminary CPD detection step above. However, in this calibration mode, the headend radar unit is able to cancel out any real CPD echo signals and only process the calibration signal.

Methods of locating a CPD source in an HFC CATV network are also contemplated by the present invention. One such method comprises the steps of: (a) using a double sideband probing signal to determine an approximate time delay associated with the CPD source (as a preliminary step); (b) cross-correlating CPD distortion products of the forward path TV program signals, received in the return path, with a locally produced replica of the CPD distortion products; (c) guiding the cross-correlation in step (b) by delaying the replica of the CPD distortion products by the approximate time delay determined in step (a); and (d) determining the time delay of the CPD source based on the cross-correlation in steps (b) and (c). The method may further comprise the step of suppressing the return path service signals before performing the cross-correlation in step (b). The method may further comprise the step of employing a portable radar-calibrator unit at a plurality of connection points along the CATV network to locate the CPD source.

A method of calibrating a CATV network employing a portable radar-calibrator unit, comprising the steps of: (a) connecting the portable radar-calibrator unit to the CATV network at a calibration point; (b) generating a simulated CPD distortion product as a calibration signal in the return path frequency spectrum, where the calibration signal has a pulse train; (c) altering the pulse train of the calibration signal to distinguish it from a distortion product from a CPD source located near the calibration point; (d) transmitting the calibration signal with the altered pulse train back to the headend in the return path; (e) detecting the calibration signal at the headend substantially independent of the CPD distortion product; and (f) determining the time delay between the headend and the calibration point to establish a calibrated time delay associated with the location of the calibration point. The pulse train of the calibration signal may be altered in step (c) by blanking every other pulse in the pulse train. The calibration signal may be detected in step (e) by inverting every other pulse of a pulse train of the CPD distortion product and performing coherent accumulation of the calibration signal and CPD distortion product, such that the pulse train of the CPD distortion product cancels itself out and the pulse train of the calibration signal is accumulated.

BRIEF DESCRIPTION OF THE DRAWING

Further objects of the present invention will become apparent from the following description of the preferred embodiment with reference to the accompanying drawing, in which:

FIGS. 3a-3c illustrate the process of forming a double sideband RF probing signal in the headend radar unit of FIG. 2, where FIG. 3a is a baseband probing signal, FIG. 3b is an IF double sideband modulated version of the probing signal, and FIG. 3c is an RF double sideband modulated version of the probing signal;

FIGS. 14*a* and 4*b* illustrate common connection points in a coaxial cable network for the portable radar-calibrator unit, where FIG. 14*a* shows a connection to test points of a trunk amplifier and FIG. 14*b* shows a connection to a port of a tap;

DETAILED DESCRIPTION OF THE PREFERRED EMBODIMENT

Figure 1:
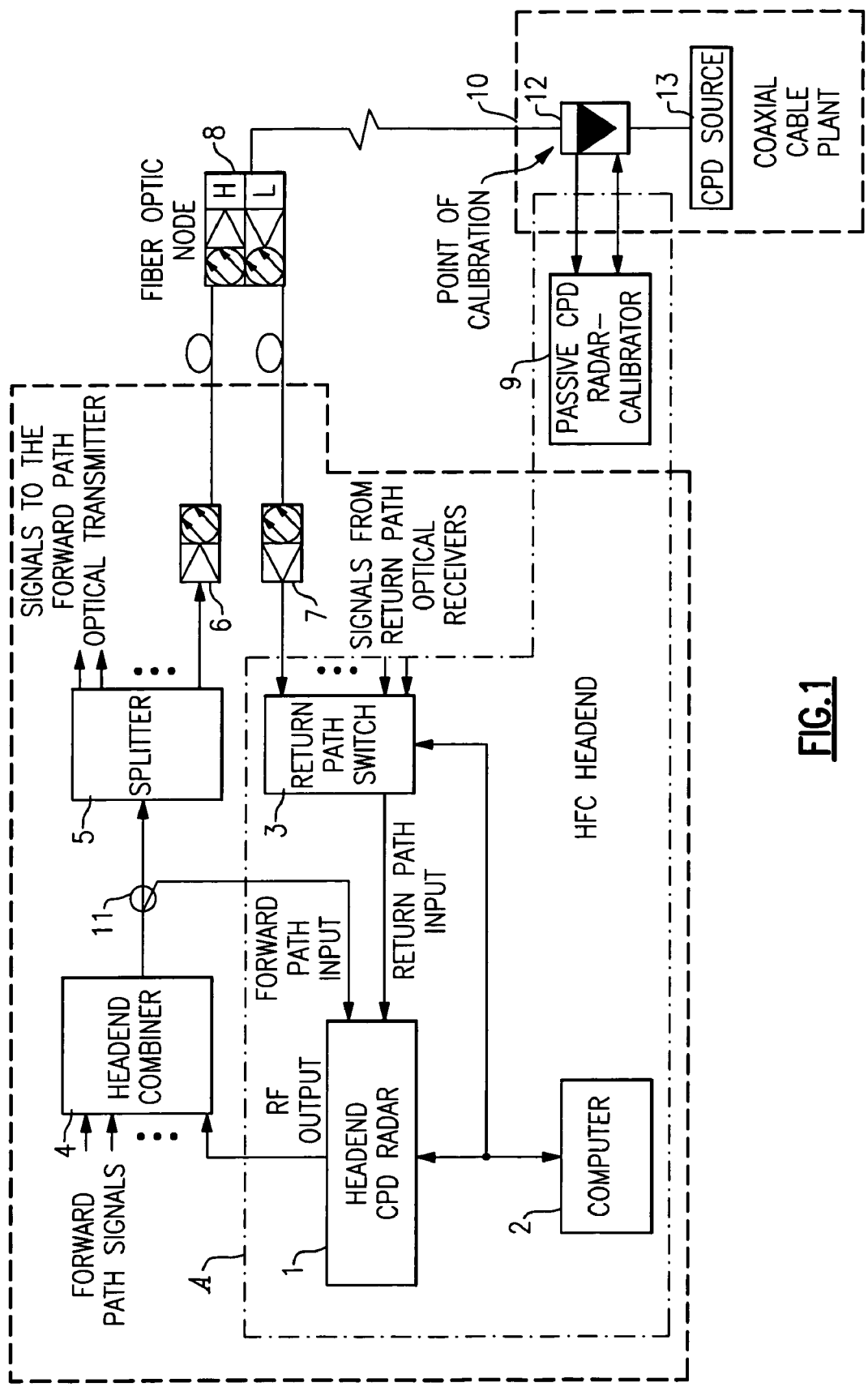
FIG. 1 is a simplified block diagram of a system of the present invention for pinpointing CPD sources and of its connections to a two-way HFC CATV network.

FIG. 1 shows a simplified block diagram of a preferred embodiment of a CPD pinpointing system A of the present invention. System A is incorporated into an HFC headend and a coaxial cable portion of an HFC cable TV network. System A includes the following equipment connected at the headend: a headend CPD radar unit 1, a return path switch 3, and a computer 2. System A further includes equipment connected directly to the coaxial cable portion of the network—a portable passive CPD radar-calibrator unit 9. The general headend equipment includes a headend combiner 4 for combining forward path signals (i.e., analog and digital TV program signals), a signal splitter 5 for delivering the forward path signals to a plurality of optical nodes, a plurality of optical transmitters 6 for transmitting the forward path signals to fiber optic nodes in the fiber optic portion of the HFC network, and a plurality of optical receivers 7 for receiving return path signals from the optical nodes and delivering them to headend receivers (not shown).

Headend CPD radar unit 1 has two inputs: one is connected to an output of return path switch 3, and the other is connected to an output of combiner 4, through a tap 11. An output ("RF OUTPUT") of radar unit 1 is connected to an input of combiner 4. The analog and digital TV program signals of the forward path are applied to the other inputs of combiner 4.

The combined output of combiner 4 is connected to an input of splitter 5. The outputs of splitter 5 are connected to the inputs of optical transmitters 6. The forward path signals are transmitted from transmitters 6 over optical cables to corresponding optical nodes 8, as shown in FIG. 1. As previously indicated, the output of combiner 4 is also coupled through tap 11 to an input of radar unit 1.

Management of radar unit 1 and switch 3 is carried out with the help of computer 2. As shown in FIG. 1, computer 2 is connected to radar unit 1 and switch 3. Computer 2 is programmed to control switch 3 and cause switch 3 to connect the return path signals from each optical receiver 7 to the input of radar unit 1, separately, in a cyclic or programmed (or selective) manner. In addition, computer 2 performs processing and storage of information received from radar unit 1.

With further reference to FIG. 1, the output of optical nodes 8 are connected to a coaxial cable plant 10 of the network. Nodes 8 convert the forward path optical signals to RF signals for transmission down coaxial cable plant 10 and convert the RF return path signals to the optical spectrum for transmission to optical receivers 7. Coaxial cable plant 10 is generally arranged in a tree-and-branch pattern, between nodes 8 and a multiplicity of subscribers' homes (not shown). Portable radar unit 9 is deployed in the field, and is connected to cable plant 10 at various points 12 for the purpose of conducting field searches of CPD sources 13 and for calibrating the cable plant.

Generally, CPD pinpointing system A includes two basic operating modes—(1) CPD detection mode, and (2) calibration mode.

The detection (or range finding) of a CPD source is accomplished by measuring or determining the time delay $\Delta T$ of signals propagating to and from the CPD source. In a preliminary range finding step, a specific probing signal may be used, such as a double sideband modulated radar chirp pulse. In a more rigorous second step, the actual forward path digital or digital and analog TV program signals are used as a probing signal. The time delay $\Delta T$ is actually the total propagation time of the probing signal traveling from a reference point (e.g., the headend) to the CPD source and of a distortion product of the probing signal traveling back from the CPD source to the reference point. A CPD source produces distortion products of signals propagating in the forward path. The low frequency distortion products of these forward path signals propagate back to the headend, in the return path. It is these low frequency distortion products that are available for detection and CPD range finding, provided that the original forward path signals are available as a reference. The low frequency distortion products may include second and third order intermodulation products of the forward path signals. The use of these products in CPD range finding will be described in more detail below.

CPD Detection Mode—Preliminary Step

Figure 2:
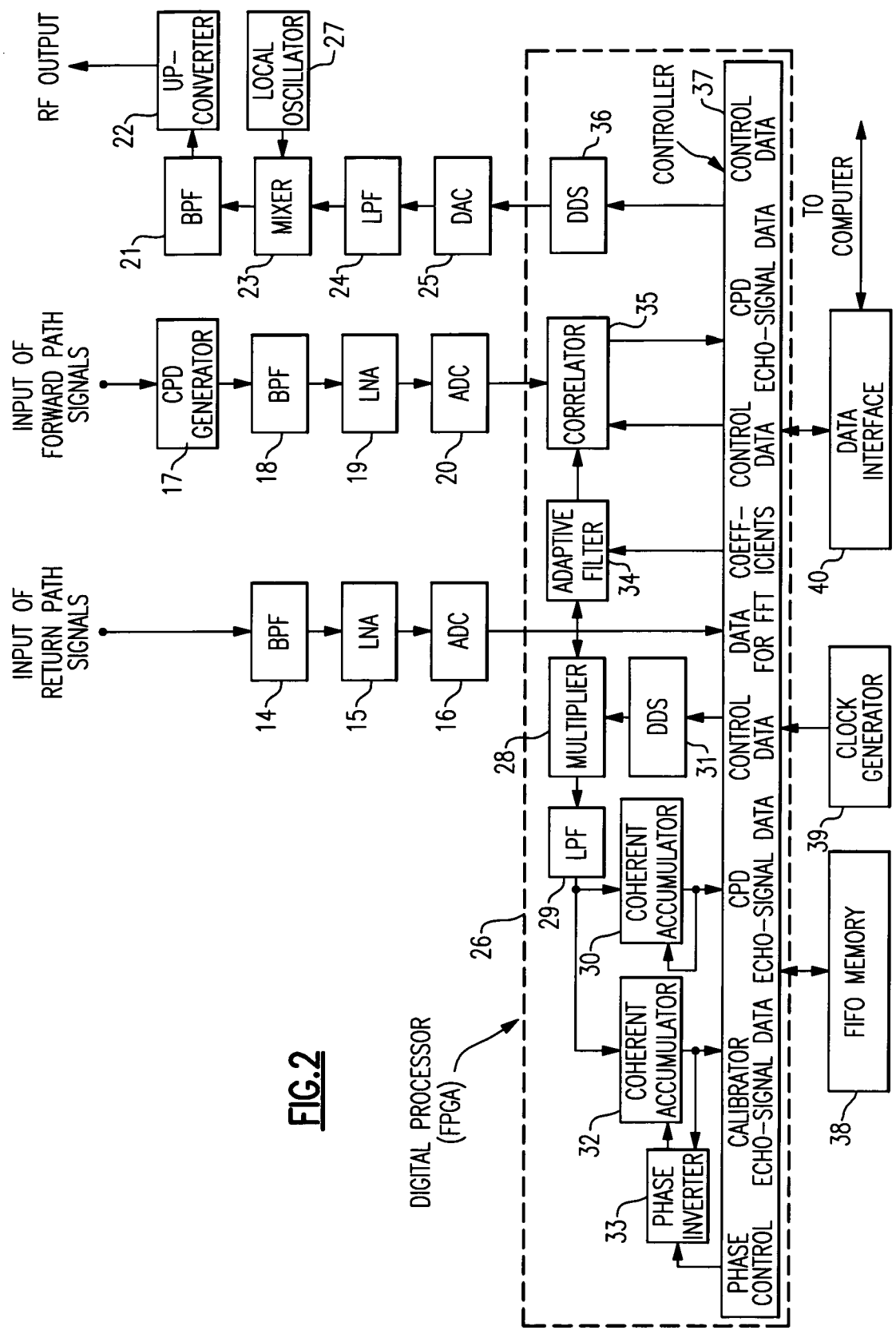
FIG. 2 is a simplified block diagram of a headend CPD radar unit constructed in accordance with the present invention.

After return path switch 3 has connected CPD radar unit 1 to a given return path receiver 7 of a chosen optical node 8, radar unit 1 creates a specific probing signal at its RF OUTPUT for detection of CPD sources. A block diagram of radar unit 1 is shown in FIG. 2. Formation and processing of signals are carried out in the digital form in a digital processor 26, which can be implemented in a field programmable gate array (FPGA).

The processing channel through which the specific probing signal is formed includes a controller 37, a direct digital synthesizer (DDS) 36, a digital-to-analog converter (DAC) 25, a lowpass filter (LPF) 24, a mixer 23, a local oscillator 27, a bandpass filter (BPF) 21, and an upconverter 22. In one embodiment, the probing signal may be a periodic sequence of coherent pulses. In turn, the probing signal is modulated as a double sideband signal in mixer 23, by balanced modulation of a carrier signal from local oscillator 27 and the probing signal formed by DDS 36, DAC 25 and LPF 24. The signal formed in DDS 36 may also be frequency or phase modulated in accordance known methods employed in radar-location or range finding, provided that the result has an autocorrelation function approximating an impulse or Dirac function.

The frequency and bandwidth of the probing signal formed in DDS 36 ("baseband probing signal") are chosen so that the spectrum of a second harmonic of the signal falls in the spectrum of the return path of the HFC network. It is desirable that the second harmonic be located in an unoccupied portion of the return path spectrum. The choice of parameters of a probing signal will be described below in more detail using, as an example, a chirp signal.

After balanced modulation in mixer 23, the double sideband version of the probing signal ("IF probing signal") is filtered in bandpass filter 21, and the result is upconverted to an RF frequency band in the forward path frequency spectrum ("RF probing signal"). FIGS. 3a, 3b, 3c show an example of modulating a baseband probing signal (FIG. 3a) to a double sideband IF signal (FIG. 3b) and upconverting the IF signal to produce an RF probing signal for transmission in the forward path spectrum (FIG. 3c). As shown in FIG. 3a, a baseband probing signal 41, at the output of lowpass filter 24, has a frequency band from 3 MHz to 6 MHz. In mixer 23, signal 41 is exposed to balanced modulation with a signal from local oscillator 27. The frequency of the local oscillator signal is chosen equal to a standard value of 70 MHz. The resulting IF probing signal (FIG. 3b) has a lower sideband 42, an upper sideband 43, and a suppressed residue signal 44 of the local oscillator signal. The 70 MHz IF signal has a bandwidth of 12 MHz. The IF signal is then upconverted in upconverter 22 to an RF band in the forward path spectrum. It is preferred that the center frequency of the RF probing signal be located in the roll-off portion of the forward path spectrum, so that the probing signal does not occupy a portion of the spectrum utilized by the TV program signals. As shown in FIG. 3c, the RF probing signal is centered at frequency 47, which is placed above, for example, 860 MHz. The RF probing signal contains a lower sideband 45 and an upper sideband 46 which are associated with IF sidebands 42 and 43, respectively.

Figure 4:
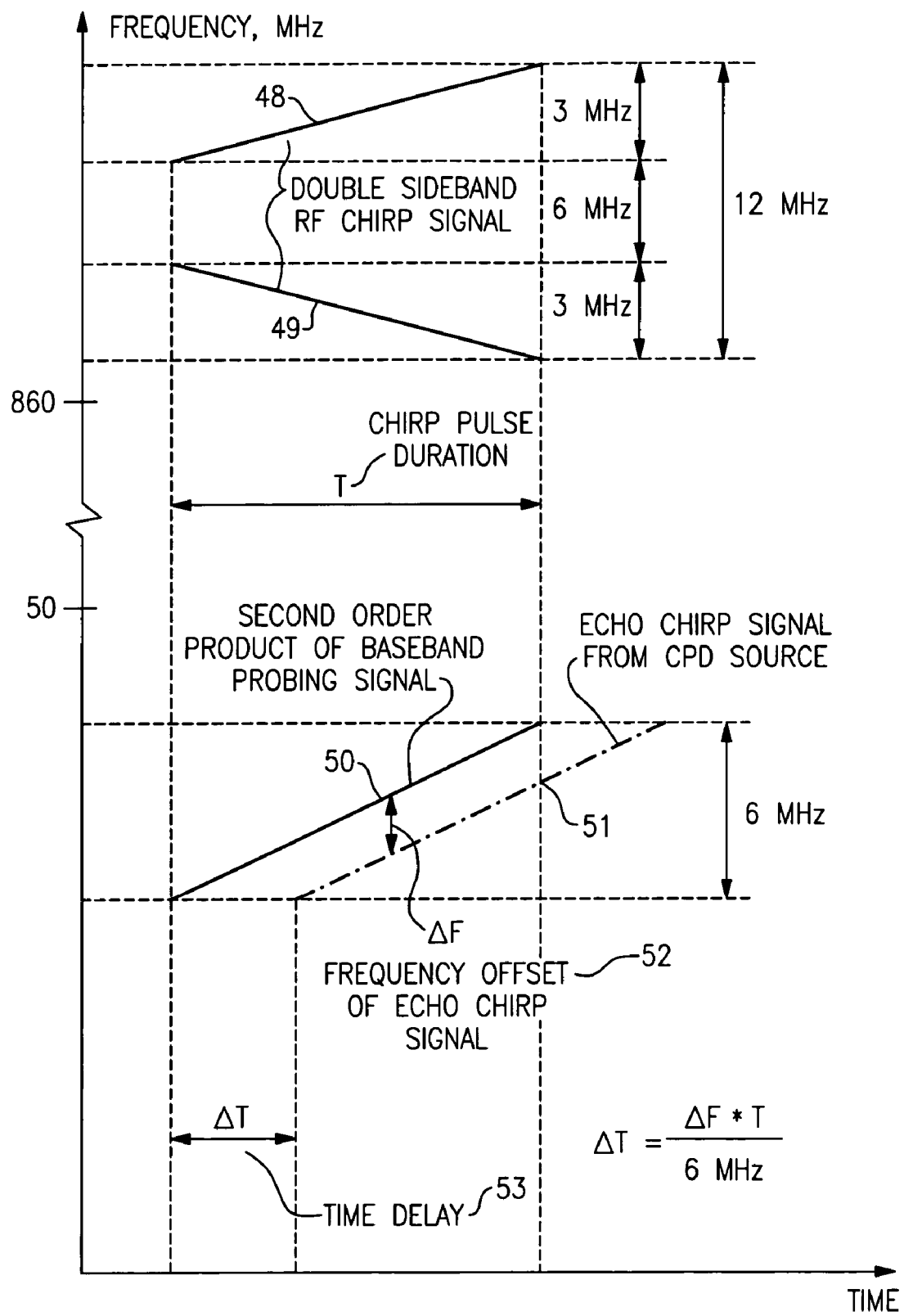
FIG. 4 is a frequency-time domain plot of a chirp double sideband probing signal in the forward path and a corresponding chirp echo signal in the return path.

FIG. 4 shows an example of an RF double sideband probing signal plotted on a frequency-time domain graph. The double sideband signal is derived from a baseband probing signal (from DDS 36) which has linear frequency modulation (chirp pulse) with a deviation of 3 MHz. The RF probing signal, at the output of upconverter 22, represents two chirp pulses 48 and 49, modulated in a linear manner in opposite (mirror) directions and having a pulse duration T. FIG. 4 also shows a second order intermodulation product 51 produced from RF chirp pulses 48 and 49 at a CPD source. Intermod product 51 is shown coincident with the second order harmonic 50 of the baseband probing signal. As expected, second order product 50 and intermodulation product 51 have a deviation of 6 MHz, which is twice that of the baseband probing signal.

With further reference to FIG. 4, intermodulation product 51 is formed by the frequency mixing of RF chirp pulses 48 and 49 at CPD source 13 (FIG. 1). This signal (51) is analogous to an echo signal in a classic radar system. However, signal 51 is the intermodulation product of the original signal, not merely a reflection (echo) of the original signal. Signal 51 does contain, however, the same time delay information that a classic echo signal would contain. Signal 51 propagates back to the headend because its frequency is within the return path spectrum. Signal 51 arrives at the headend with a time delay ($\Delta T$) 53, proportional to the remoteness of CPD source 13. The instantaneous value of intermodulation product 51 differs from a corresponding value of second order harmonic 50 of the initial baseband chirp signal by a frequency offset ($\Delta F$) 52, which is directly proportional to time delay ($\Delta T$) 53 in the expression:

$$\Delta T = (\Delta F \cdot T) \div 6 \text{ MHz} \tag{Equation 1}$$

Figure 5:
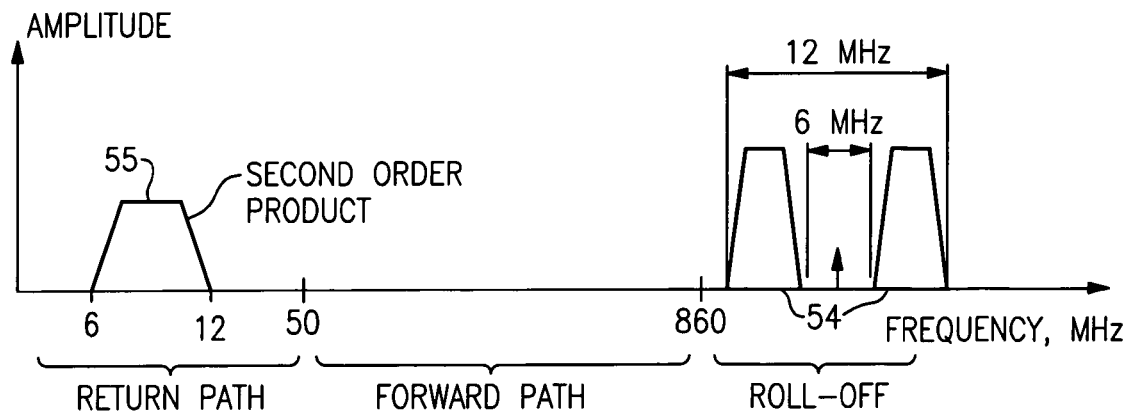
FIG. 5 is a frequency plot of an RF double sideband probing signal in the forward path and a second order intermodulation product of this signal in the return path.

FIG. 5 shows an example of a second order intermodulation product 55 in the return path, derived from an RF double sideband probing signal 54 in the forward path.

It is necessary to explain further the properties of a double sideband signal for detecting CPD sources. A double sideband signal possesses the remarkable property that, in the case of nonlinear distortions, for example, as produced by a CPD source, the second order intermodulation product from the two sidebands (of the double sideband signal) does not depend at all on the parameters of the local oscillator signal or the upconverter used to generate the double sideband signal. In particular, a wideband noise-like signal may be used as a local oscillator signal, having a bandwidth in the hundreds of megahertz, for example, from 100-750 MHz. In this case, upconverter 22 becomes unnecessary, and the signal from output mixer 23 can be sent directly into the forward path as a probing signal for detection of CPD sources. The spectrum of such a signal will be close to white noise. Such a signal will not interfere with the RF TV program signals in the forward path, provided that its energy spectral density is below the noise floor at the output of headend combiner 4. In other words, the energy of the signal must be less than the energy of the noise at the output of combiner 4.

In the case of a wideband noise local oscillator signal, in general, there is no concept of a carrier frequency. Thus, in the case of nonlinear distortions of such a wideband noise signal, precisely the same intermodulation products of the probing signal will be formed in the return path, as in the case where the local oscillator signal is a continuous wave (CW) carrier (as in FIG. 3 and FIG. 5).

For a better presentation and easier understanding, we limit our further discussion to the case where the local oscillator signal is a CW signal and the spectrum of the RF double sideband probing signal is placed in the roll-off area of the forward path (FIGS. 3, 4, 5). The wideband noise example given above should nevertheless be kept in mind as a perspective. The fact that the second order intermodulation product of a double sideband signal does not depend on the parameters of the frequency transformation circuits (e.g., local oscillator 27), and the fact that such intermodulation product coincides with the second harmonic of the baseband probing signal (e.g., from DDS 36), allows one to carry out long coherent accumulation of the intermodulation product from a CPD source. Further, it allows one to detect intermodulation products having levels much below the noise level of the receiver. The intermodulation product from a CPD source will also be referred to herein as an "echo signal" or "echo chirp signal," as the case may be.

In the case of a double sideband chirp signal, a reference or "de-chirping" signal (e.g., signal 50 in FIG. 4) is easily formed with precision accuracy using a direct digital synthesizer (DDS) 31 (FIG. 2). DDS 31 is exactly the same as DDS 36. However, DDS 36 forms a baseband probing signal (e.g., signal 41 in FIG. 3a) and DDS 31 forms a signal equivalent to the second harmonic of the baseband probing signal (e.g., like signal 55 in FIG. 5). In other words, the signal from DDS 31 has twice the bandwidth and center frequency of the probing signal from DDS 36. The output frequencies of DDS 31 and DDS 36 are determined by applying a binary code at the input of DDS 31 and DDS 36. For a chirp signal, the binary code is formed by a binary counter. DDS 31 and DDS 36 are controlled by the same binary counter in controller 37.

Referring again to FIG. 4, echo chirp signal 51 is received in the return path spectrum. In FIG. 1, this signal is received from one of the optical receivers 7, via return path switch 3, and is received by headend radar unit 1 through the return path input. As shown in FIG. 2, signal 51 is filtered in a bandpass filter 14, amplified in a low noise amplifier (LNA) 15, and is transformed to the digital form in analog-to-digital converter (ADC) 16. The signal from ADC 16 is applied to an input of multiplier 28. A signal formed by DDS 31 is applied to the other input of multiplier 28. DDS 31 forms a de-chirping signal (e.g., signal 50 in FIG. 4) which is equivalent to the second harmonic of the baseband chirp signal formed in DDS 36, as previously explained. For this purpose, the current frequency parameters (i.e., bandwidth and center frequency) set in DDS 31 are doubled in relation to what is set in DDS 36. The current instantaneous frequency of the chirp signals are set by binary codes produced by the binary counter in controller 37.

In multiplier 28, multiplication of the reference or de-chirping signal 50 (FIG. 4) and the time-delayed echo chirp signal 51 (FIG. 4) is carried out. This step is referred to as "de-chirping" the echo signal. The result is a low-frequency signal having a center frequency equal to the frequency offset ($\Delta F$) 52 (FIG. 4). The de-chirped signal from multiplier 28 is filtered in lowpass filter (LPF) 29 and applied to a coherent accumulator 30. Coherent accumulation of pulses from LPF 29 is performed in coherent accumulator 30. Coherent accumulation improves the noise immunity of the CPD detection, from sources such as background noise in CPD radar unit 1 and various interfering signals in the return path, such as pulse and ingress noise. The signal from the output of coherent accumulator 30 is passed to controller 37 and further through a data interface 40, and then to computer 2 (FIGS. 1 and 2). In computer 2, a Fast Fourier Transform (FFT) operation is performed on the de-chirped signal and the time delay $\Delta T$ (FIG. 4) is determined. This is a standard method of processing chirp pulses used in radar-location. The range of the CPD source is then calculated from the time delay $\Delta T$ and the velocities of propagation of signals through the HFC network.

Practical tests have shown that for reliable detection of CPD sources in the presence of intensive interference such as ingress noise, the duration T of the double sideband pulses and the number of coherently accumulated pulses N, can be chosen T=3 . . . 5 msec and N=64 . . . . 128 at a 6 MHz frequency deviation of the echo signal in the return path. The corresponding baseband signal thus would have a deviation of 2-3 MHz. The potential resolution of range finding of CPD sources is defined by the frequency deviation of the echo signal. For the example presented in FIG. 4, the potential resolution is about 70 ft. In some cases such resolution is not sufficient to locate a CPD source. Therefore, after a preliminary range is determined for a CPD source using a double sideband probing signal, as described above, a second step is taken. The second step provides increased resolution and provides for an inherently more accurate determination of the range to the CPD source. This second step relies on the actual digital or digital and analog RF TV program signals as a probing signal.

In one preferred embodiment, the baseband probing signal from DDS 36 is a sequence of chirp pulses having a frequency deviation of 2.5 MHz and a center frequency of 5 MHz. The corresponding RF double sideband probing signal, from upconverter 22, has upper and lower sidebands that are spaced by 7.5 MHz (10 MHz center-to-center spacing). Thus, the overall bandwidth of the double sideband probing signal is 12.5 MHz. The second order harmonic or intermodulation difference product of such a probing signal has a bandwidth of 5 MHz and is centered at 10 MHz. In this embodiment, Equation 1 is: $\Delta T=(\Delta F \cdot T) \div 5$ MHz.

CPD Detection Mode—Precision Step

Figure 6:
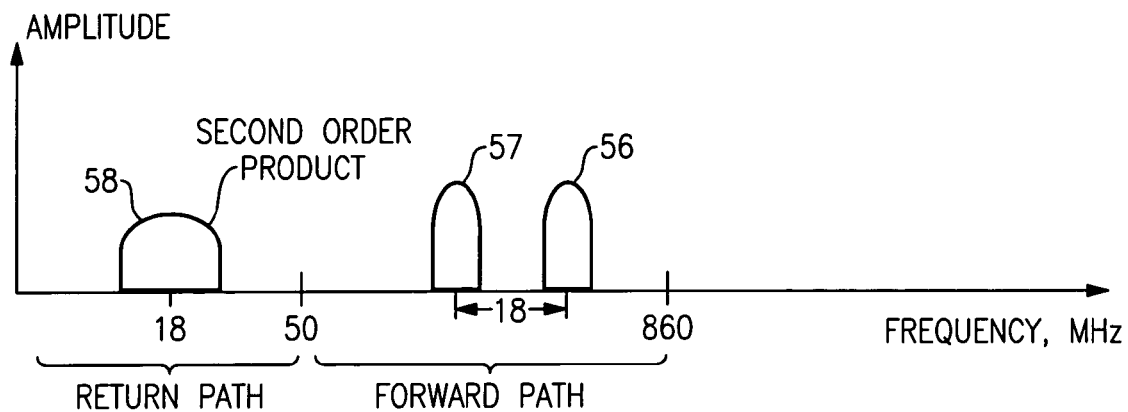
FIG. 6 is a frequency plot of two non-contiguous digital QAM TV channels in the forward path and a second order intermodulation product of these channels in the return path.

In a precision step, the echo-signal is actually a selection of intermodulation products in the return path spectrum, resulting from distortion of forward path TV program signals at CPD sources. In one example, shown in FIG. 6, we focus on the intermodulation products of the second order resulting from CPD distortion between two digital, quadrature amplitude modulated (QAM) channels 56 and 57 (non-contiguous channels). The bandwidth of each QAM channel 56, 57 is 6 MHz and the center-to-center spacing between channels is 18 MHz. A second order product 58 of channels 56 and 57 has a center frequency at 18 MHz in the return path band and a bandwidth of 12 MHz. Signal 58 is assumed to behave like Gaussian noise, and this assumption is used in the design of a CPD detector, to be described below.

Figure 7:
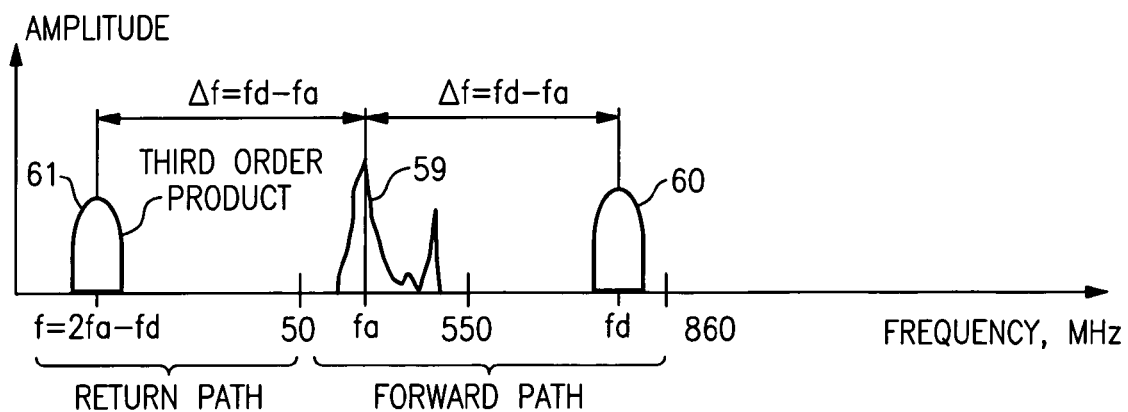
FIG. 7 is a frequency plot of an analog TV channel and a single digital QAM TV channel in the forward path and a third order intermodulation product of these signals in the return path.

The echo signal may also comprise third order intermodulation products formed between analog channels and digital QAM channels, as a result of CPD. An example of this case is shown in FIG. 7. An analog channel 59 and a digital QAM channel 60 is mixed together at a CPD source and creates a third order product 61 in the return path band. The basic energy of third order product 61 is centered at frequency F=2fa−fd, where fa is the video carrier frequency of analog channel 59 and fd is the carrier frequency of QAM channel 60.

Figure 8:
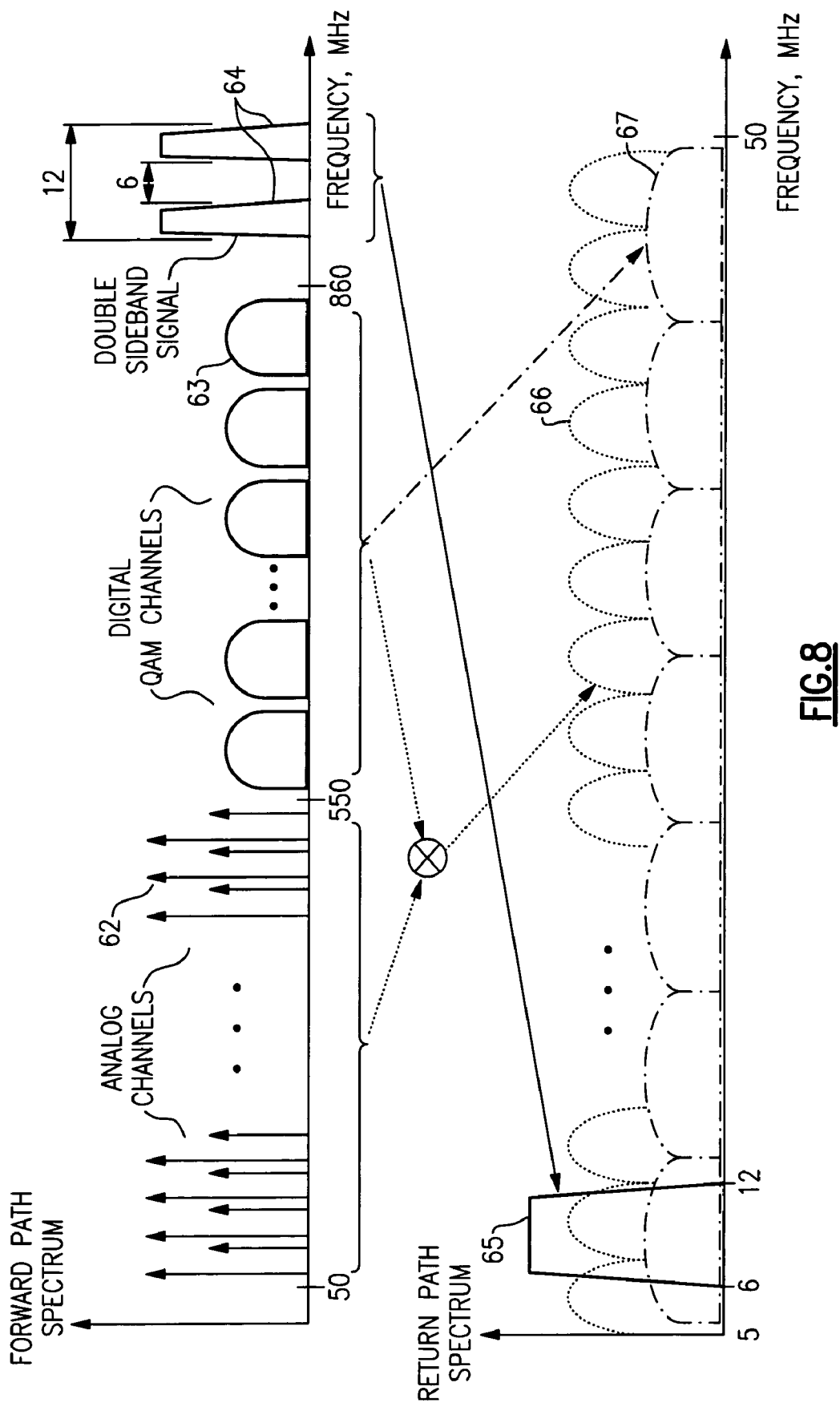
FIG. 8 is a pair of frequency plots, where the upper plot illustrates a typical amplitude spectrum in the forward path containing analog and digital QAM channels and a double sideband probing signal in a roll-off region of the forward path spectrum, and the lower plot illustrates a typical composite amplitude spectrum in the return path containing second and third order intermodulation products of the digital and analog channels and the second order intermodulation product of the probing signal.

Referring to FIG. 8 (top), a forward path spectrum contains analog TV channels 62, digital QAM TV channels 63, and a double sideband probing signal 64. The return path spectrum (bottom) shows second and third order intermodulation products, including, e.g., third order products 66 between analog channels 62 and QAM channels 63, second order products 67 between QAM channels 63, and a second order product 65 from the double sideband signal 64. The integrated spectrum of intermodulation products 66 and 67 (not product 65) are treated as a composite noise signal (CNS), having a bandwidth as wide as the entire return path or only a portion of the return path. It is referred to as the composite noise signal because it has properties close to Gaussian white noise, i.e. it has an autocorrelation function close to a Dirac or impulse function. Such signal characteristics are ideal in radar-location from the point of view of accuracy of measurement and resolution. In the present invention, the composite noise signal is used as the so-called echo signal for CPD detection. The composite noise signal offers a significant increase in signal energy available for CPD detection and, accordingly, improved accuracy of time-delay measurement and sensitivity for detecting relatively "weak" CPD sources. The detection of relatively weak CPD sources is an important advantage over the Eastment System, because it allows a network operator ample time to eliminate CPD sources before they become a noticeable problem. With the present invention, the network operator is now able to establish a preventative maintenance program and minimize the incidents where it has to react to an emergency.

Figure 9:
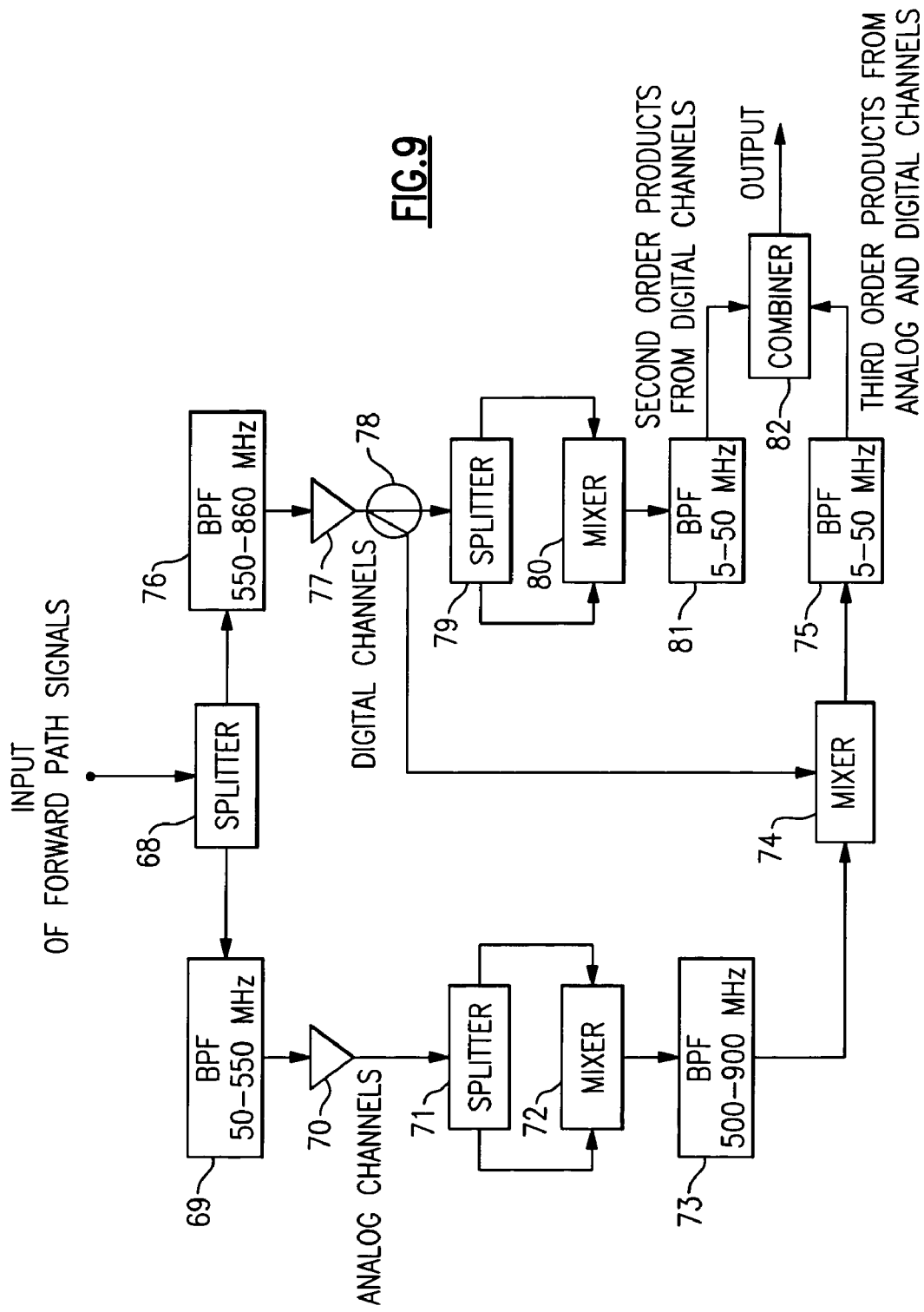
FIG. 9 is a simplified block diagram of a CPD generator of the present invention, used in the headend radar unit of FIG. 2.

The use of the composite noise signal as an echo signal for CPD detection is carried out as follows. The spectrum of forward path signals from the output of combiner 4 is applied, through tap 11, to the Forward Path Input of headend CPD radar unit 1 (FIG. 1). In radar unit 1, the forward path signals are received by a CPD generator 17 (FIG. 2). A block diagram of CPD generator 17 is shown in FIG. 9. The forward path signals are split into two signal paths in a splitter 68. One path is received by a bandpass filter 69 and the other path is received by a bandpass filter 76. Bandpass filter 69 filters out all signals except the analog channels in the frequency band, e.g., 50-550 MHz. Bandpass filter 76 filters out all signals except the digital channels in the frequency band, e.g., 550-860 MHz. The frequencies given here were selected on the basis of an NTSC system with U.S. channel spacing and typical allocations for analog and digital channels. For PAL systems, or systems using differently defined forward and return paths frequency bands, the selected frequencies and the embodiment would correspondingly change. Also, if the typical analog or digital channel allocations were changed, or if the analog channels were discontinued in CATV networks, then the selected frequencies and the embodiment would again correspondingly change.

The output of bandpass filter 69 is amplified in an amplifier 70 and split into two paths in a splitter 71. The two paths are inputs to a mixer 72, where second order intermodulation products of the analog channels are formed, falling into the range of summed and difference frequencies. Products at the summed frequencies (e.g., 2fa), in the 500-900 MHz range, are selected by a bandpass filter 73, and the output of filter 73 enters an input of a mixer 74.

The output of bandpass filter 76 is amplified in an amplifier 77, passed through a tap 78, and split into two paths in a splitter 79. The two paths are inputs to a mixer 80, where as a result of multiplication the second order intermodulation products of the digital channels are formed. The products at the difference frequencies, in the 5-50 MHz range (e.g., second order products 67 in FIG. 8), are selected by a bandpass filter 81 and applied to an input of a combiner 82.

The amplified digital channels (e.g., fd) from amplifier 77 are coupled to another input of mixer 74, via tap 78. Intermodulation products of the second order (e.g., F=2fa−fd) are formed in mixer 74, which are the third order products between the analog and digital channels (e.g., third order products 66 in FIG. 8). The output of mixer 74 is filtered in a bandpass filter 75, where the third order products in the 5-50 MHz range are selected and applied to another input of combiner 82.

The combined output of combiner 82 contains the second order products from the digital channels and the third order products from the analog and digital channels, in the 5-50 MHz range (i.e., the return path spectrum). This output is the output of CPD generator 17, which represents a zero time-delay version of the composite noise signal expected to be received in the return path. It functions as a reference for the echo signal (which is the actual composite noise signal).

As shown in FIG. 2, the return path signals, including the composite noise signal, is filtered in a bandpass filter 14, amplified in a low noise amplifier 15, and converted to a digital signal in an analog-to-digital converter (ADC) 16. The output of CPD generator 17 is filtered in a bandpass filter 18, amplified in a low noise amplifier 19, and converted to a digital signal in an analog-to-digital converter (ADC) 20. The sampling frequency of ADCs 16 and 20 is derived from a clock generator 39 and is not less than twice the highest frequency in the return path.

The output of ADC 16 not only includes the composite noise signal, but also the typical return path service signals, such as Internet, pay-per-view, and telephone signals. These service signals are actually interference from the point of view of processing the composite noise signal. Thus, their influence is minimized by an adaptive ("whitening") filter 34. Filter 34 is a finite impulse response (FIR) filter, the coefficients of which are initially calculated in computer 2 and are further assigned by controller 37.

The coefficients of filter of 34 are determined by first obtaining samples of the return path spectrum from ADC 16 and, with the help of controller 37, storing them in a FIFO memory 38. The samples are then transferred through a data interface 40 to computer 2. FIFO memory 38 is used in this embodiment because of the high frequency and resolution of the quantization in ADC 16. Therefore, FIFO memory 38 is used as a buffer for matching the sampling rate in ADC 16 and the speed of data interface 40. The samples of the return path spectrum are passed to computer 2, where a Fast Fourier Transform (FFT) is performed on them. On the basis of the obtained estimation of energy (amplitude) of the return path spectrum, the frequency response of adaptive filter 34 is synthesized. The desired response of filter 34 is the inverse or mirror image of the frequency response of the service signals in the return path. In practice, an approximate mirror image of the obtained estimation of the energy spectrum is used. The phase response of adaptive filter 34 is selected to be linear. Via a reverse FFT operation in computer 2, the coefficients for filter 34 are determined. The coefficients are then transferred through data interface 40, to controller 37, and then to adaptive filter 34 (FIG. 2). The coefficients are continually being updated through the process just described.

Figure 10:
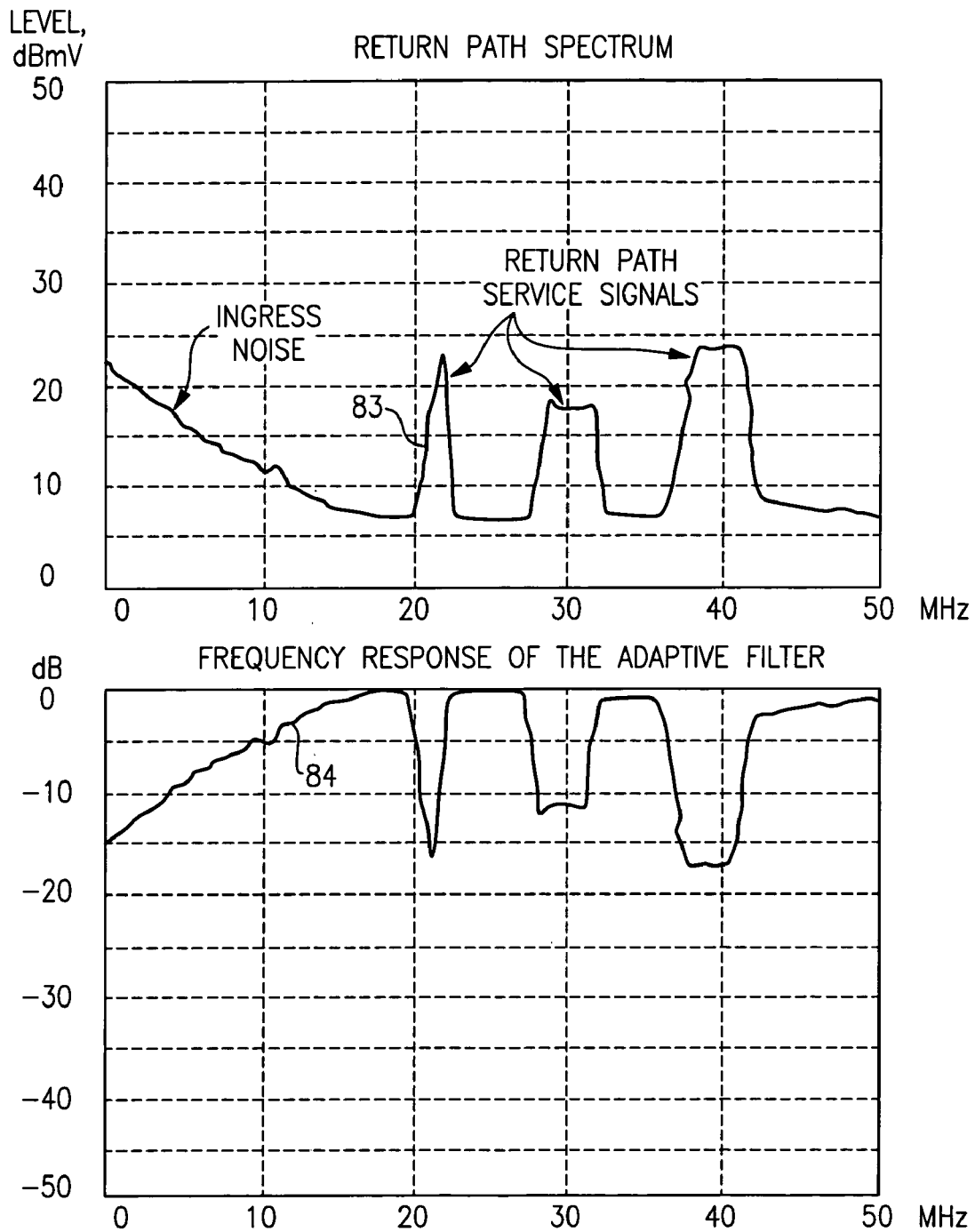
FIG. 10 is a pair of frequency plots, where the upper plot is a typical amplitude spectrum of the return path, including the return path services signals, and the lower plot is a frequency response of a corresponding adaptive filter configured to suppress the return path service signals.

FIG. 10 illustrates an example of an energy spectrum 83 of signals in the return path and a frequency response 84 of the corresponding adaptive filter 34. The principle of operation of filter 34 is the maximum suppression of signals having the maximum (level) spectral components.

Let us return to the examination of the method of using a composite noise signal as an echo signal. Referring to FIG. 2, the return path spectrum samples from ADC 16 enter adaptive filter 34, where, as it was explained above, the suppression of the undesirable (service) signals of maximum amplitude is accomplished ("whitening"). The output of filter 34 is mainly the composite noise signal or echo signal. This signal is correlated with the reference signal from (output of) CPD generator 17 in a correlator 35. The output of filter 34 is applied to a first input of correlator 35, and the digitized reference signal from CPD generator 17 is applied to a second input of correlator 35. A block diagram of correlator 35 is shown in FIG. 11.

Figure 11:
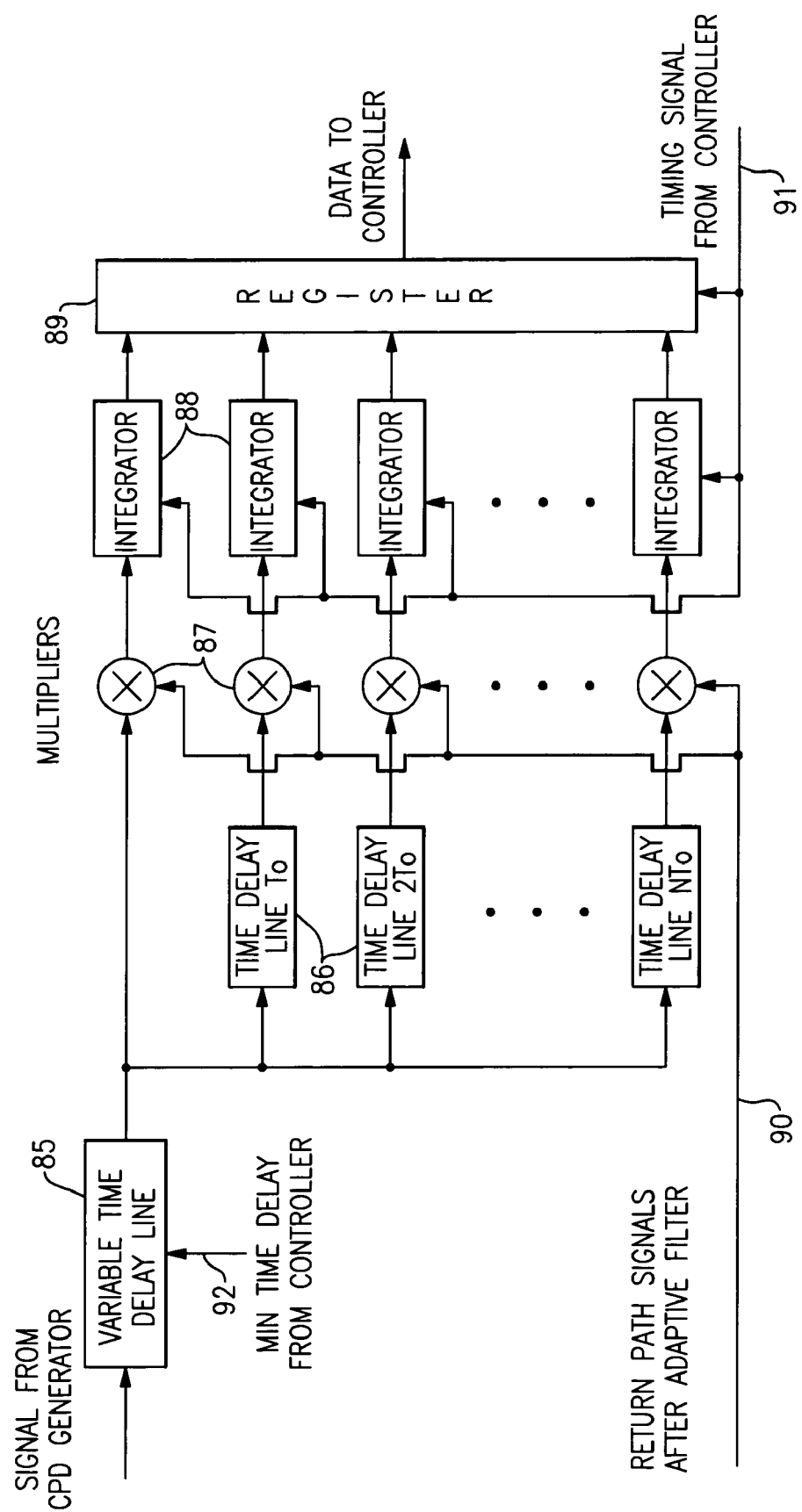
FIG. 11 is a block diagram of an N+1 channel correlator contained in the headend radar unit of FIG. 2, for processing the intermodulation products in the return path spectrum as a composite noise signal.

As shown in FIG. 11, the output signal from CPD generator 17 (with zero delay) enters a variable delay line 85. The initial time delay in delay line 85 is assigned by a control signal 92 from controller 37, based on the preliminary results of measuring the delay time to the CPD sources using the double sideband signal approach (i.e., the Preliminary Step described above). At a minimum, the time delay assigned in delay line 85 can be equal to the time delay in the fiber optic portion of the HFC network, where the appearance of CPD is generally not possible. The output of delay line 85 enters N+1 correlation processing channels. Each channel with the exception of the first contains a fixed delay line 86 containing a delay period of To·j, where j=1→N. Time To is selected equal to the period of sampling in ADC 16 and ADC 20. For example, with a sampling frequency of 100 MHz, To=10 nsec. The number of channels N+1 is selected on the basis of the maximum range of time delay in the HFC network (i.e., the total time delay from the headend to the most remote device in coaxial cable plant 10). The analysis of a sufficiently large number of statistics shows that, in a contemporary HFC network, this time delay amounts on the average up to 20 μsec. In such case, on the order of 2000 correlation channels would be required for a complete overlap of the entire range of delays. Today, this is possible with a FPGA.

Referring again to FIG. 11, the signals from delay lines 86 and one undelayed channel enter corresponding N+1 multipliers 87, respectively (delayed versions of the reference signal). The output of adaptive filter 34 (the echo signal) is applied, via signal line 90, to the other inputs of multipliers 87. The outputs of multipliers 87 are integrated in integrators 88, respectively, and the results are stored in a register 89. Control of the time of integration and readout of the results of integration from register 89 is accomplished by a control signal 91 from controller 37. The N+1 samples of the cross-correlation performed in correlator 35 is passed to controller 37. These samples represent the cross-correlation function of the reference signal from CPD generator 17 and the composite noise signal from the CPD sources. The maximums of this function will correspond to the time delay of echo-signals from the CPD sources.

Figure 12:
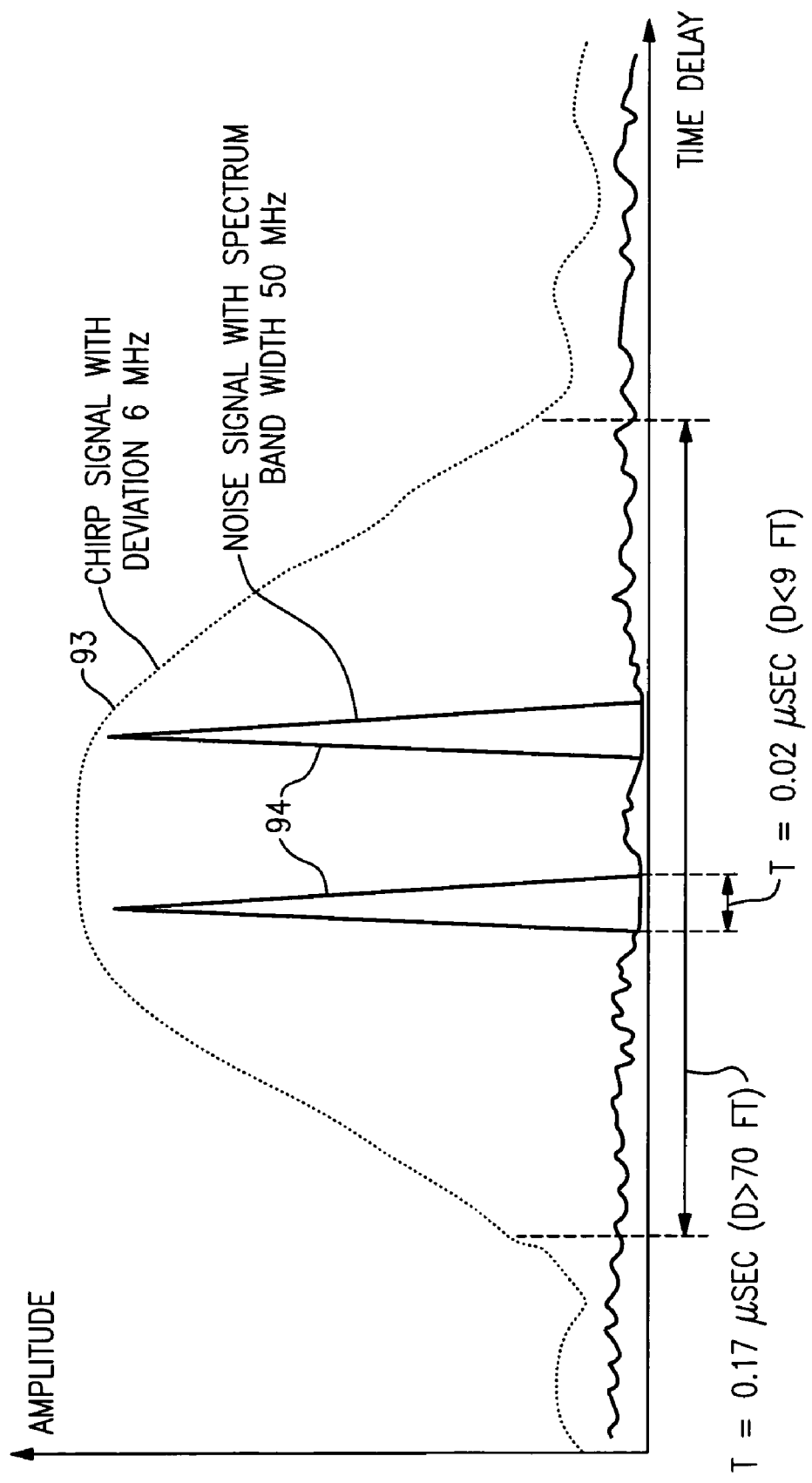
FIG. 12 is an amplitude vs. time-delay plot, comparing the time (or spatial) resolution of a double sideband chirp probing signal having a frequency deviation of 6 MHz with that of a composite noise signal with a spectrum bandwidth of 50 MHz.

FIG. 12 compares the response of coherent accumulation of a double sideband chirp echo signal (having a 6 MHz deviation) with that of cross-correlation processing of a composite noise echo signal, in the presence of two CPD sources. Curve 93 is the response using the chirp echo signal (preliminary step) and curve 94 is the response using the composite noise signal (precision step). It is not difficult to see that in the latter case the resolution increases almost by an order of magnitude. Furthermore, as noted above, in the latter case the accuracy of measurement of time delay increases due the signal-to-noise ratio improvement.

The present invention is not limited to using cross-correlation processing of the composite noise signal to detect CPD. Cross-correlation processing is a classical time-domain Radar processing approach. Another classical approach is to conduct filter processing in the frequency domain.

Thus, the process of detecting CPD sources using headend radar unit 1 includes—(1) a preliminary step of detecting the presence of CPD sources using a double sideband signal, and (b) a precision measurement step involving the use of a composite noise signal. On the basis of the time delays determined in the previously mentioned steps, and on the basis of tolerances assigned to the nodes associated with the time delays, candidate locations of the CPD sources, or candidate areas (or "zones") in which the CPD sources are located, can be identified with the use of electronic cable plant maps and/or network databases. Preferably, there is an interface between System A and an electronic map and/or database of cable plant 10, so that the candidate locations of CPD sources or candidate zones can be identified automatically.

As mentioned, tolerances may be assigned to each node and may be a factor in selecting candidate locations of CPD sources (usually devices in the network) and/or candidate zones. The tolerance value assigned to a node is determined based on the number, placement, and accuracy of calibration of the network devices within the node. For example, if a particular node has not been recently calibrated, a loose tolerance will be assigned to the node. If the node has been recently calibrated, a tighter tolerance will be assigned, such as the system tolerance of headend radar unit 1. Preferably, the tolerance values are determined automatically in computer 2; however, they may be assigned manually.

In many cases, even after the precision measurement step and use of electronic cable plant maps, there may be some uncertainty as to the location of the CPD source. As already indicated, the average range between minimum and maximum delay in a coaxial cable plant of a contemporary HFC network is up to 20 μsec. The possible number of CPD sources appearing on the average may total about 1000. This is about 1 source per 20 nsec delay, assuming a uniform distribution of delays, which is equivalent to a CPD source every 8 feet. Obviously, an ambiguity in the location of the CPD sources is unavoidable with this distribution of possible sources. The ambiguity is due not only because of the limit on accuracy of the measurement of time delay, but also because of the inaccuracies of initial data regarding the length of cable, as indicated on the map. In particular, the maps may not indicate the length of cable, but the distance between the poles to which it is fastened. In view of the likelihood of an ambiguity, it is desirable to perform a third step in the CPD detection process—one that could resolve the ambiguities. In the present invention, the third step is carried out using portable passive radar-calibrator unit 9 (FIG. 1). As its name implies, this device has a dual purpose: (a) calibration of the HFC network; and (b) field search and location of CPD sources.

It is to be understood that the preliminary step may be dispensed with and CDP detection performed directly under the precision step. As shown in FIG. 2, such an embodiment would only require the Return Path Signals INPUT and the Forward Path Signals INPUT, bandpass filter 14, low noise amplifier 15, ADC 16, digital processor 26, adaptive filter 34, correlator 35, CPD generator 17, bandpass filter 18, low noise amplifier 19, ADC 20, controller 37, FIFO memory 38, clock generator 39, and data interface 40. The remaining hardware in FIG. 2 could be switched off or eliminated. In such an embodiment, correlator 35 would require a substantial number of correlation channels (e.g., up to 2000). However, as mentioned above, this is possible today with a FPGA.

Detection Mode—Final Step

Figure 14A:
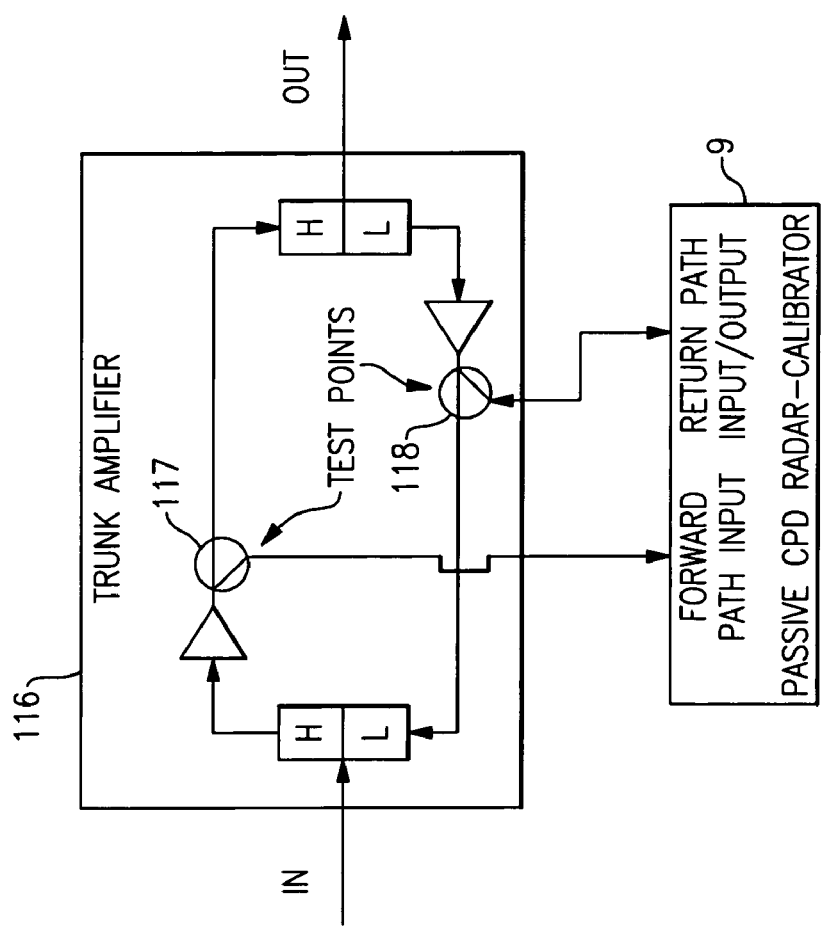
Figure 14B:
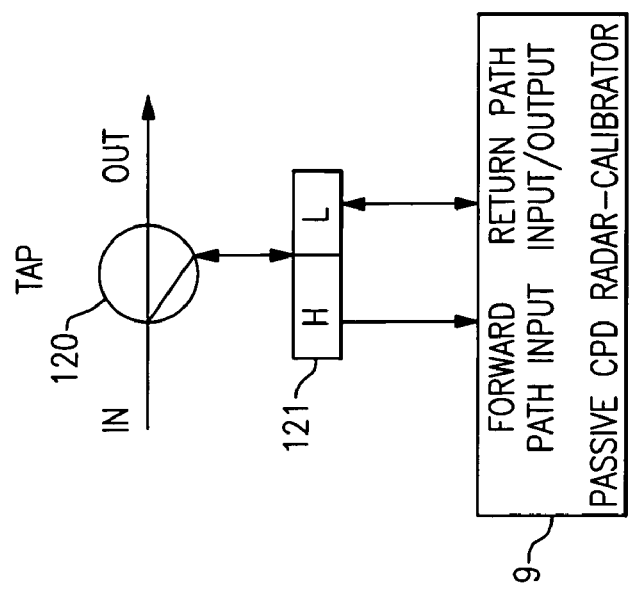

Calibration of the HFC network will be described later. We now focus on the final step of detecting CP-D sources. In this final step, the principle of operation for unit 9 is passive radar. Unit 9 is connected into coaxial cable plant 10 at different "connection points." The term, "connection point," means any point where unit 9 connects to the cable plant. For example, a connection point may be an established test point as shown in FIGS. 14a and 14b, but also may be any accessible point within coaxial cable plant 10. The initial connection point for unit 9 is usually at a device located somewhere between the fiber node and the location of the potential devices suggested by the time delay data acquired by headend radar unit 1. At a connection point, radar unit 9 simultaneously picks up signals from the forward path and echo signals from CPD sources. It then processes the echo signals to determine the time delays associated with the CPD sources.

Unit 9 also enables one to resolve in which branch of the cable system the CPD source is located. Unit 9 measures the time delay from the point of its connection in the network. This measurement is usually more accurate than a measurement at the headend because radar unit 9 is closer to the CPD source and there is usually less return path noise at a single location than at the headend. The time delay determined from unit 9 usually narrows the field of search. Unit 9 is also used to confirm that a CPD source has been eliminated after maintenance has been performed at the CPD site. This is most conveniently performed by radar unit 9 in the field and by viewing at radar unit 9 confirmation measurement results from headend unit 1.

Figure 13:
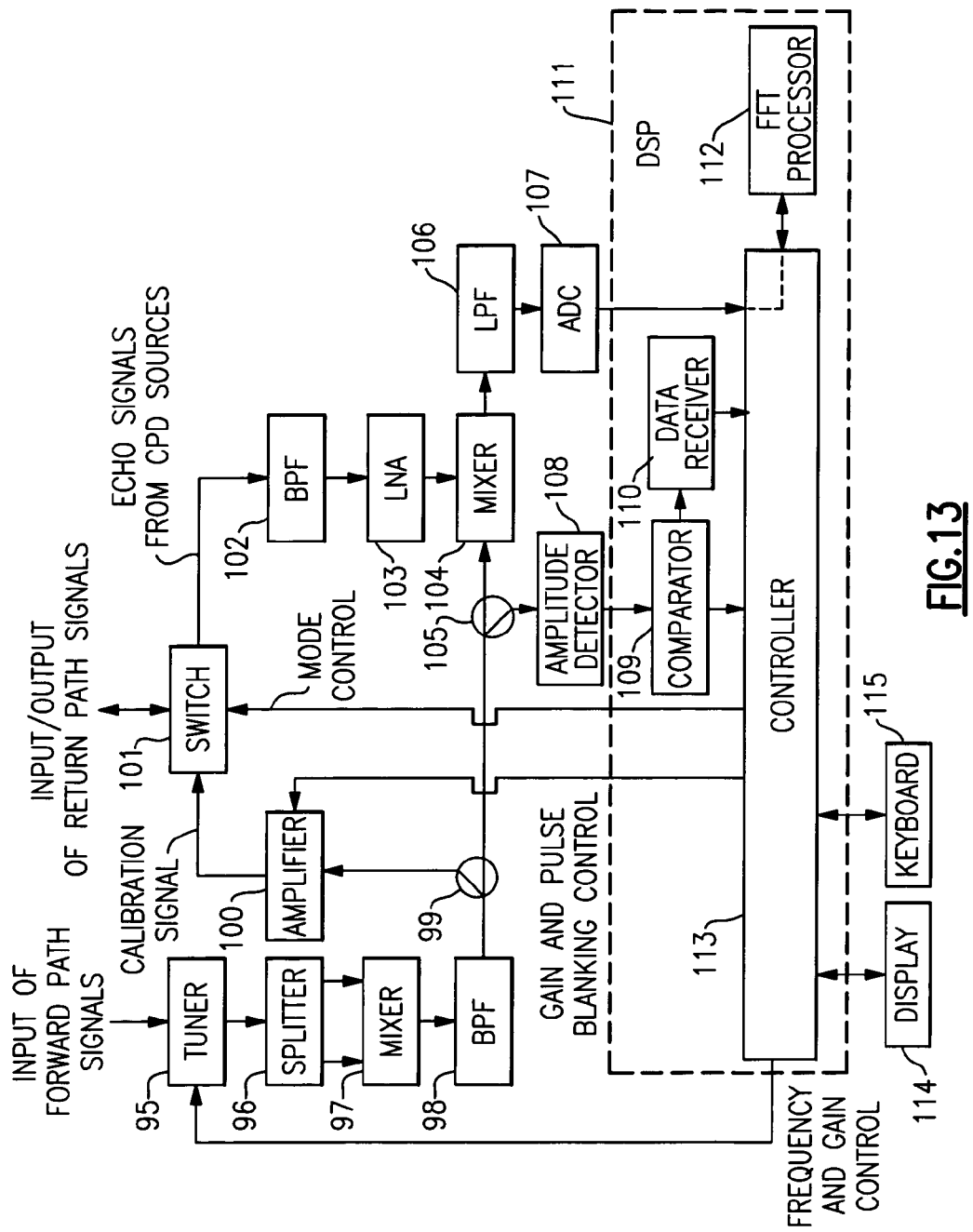
FIG. 13 is a simplified block diagram of a portable passive CPD radar-calibrator unit.

A block diagram of portable radar unit 9 is shown in FIG. 13. Unit 9 has an INPUT for forward path signals and an INPUT/OUTPUT for return path signals. At the INPUT for forward path signals, unit 9 receives a double sideband chirp signal formed by headend radar unit 1. Selective reception of this signal is achieved with the aid of a tuner 95. The double sideband chirp signal is passed at an intermediate frequency to a splitter 96. The IF chirp signal is split into two signal paths in splitter 96. The two paths are inputs to a mixer 97, where as a result of multiplication the second order intermodulation products of the chirp signal is formed. The second order difference product (e.g., second order product 50 in FIG. 4) is selected by a bandpass filter 98 (e.g., in the 6-12 MHz range, as in FIG. 5). The output of filter 98 is passed through a tap 99 and a tap 105 and applied to a mixer 104. The signal applied to mixer 104 is considered the chirp reference signal.

At a return path INPUT/OUTPUT, the return path signals enter a switch 101 and are routed to a bandpass filter 102. Bandpass filter 102 allows chirp echo signals from CPD sources (e.g., signal 51 in FIG. 4) to pass to a low noise amplifier 103 and be amplified. The amplified echo chirp signals are then applied to another input of mixer 104. Mixer 104 mixes the echo signals with the second order difference product of the forward path chirp signal created in mixer 97 (e.g., signal 50 in FIG. 4). This latter process is sometimes referred to as de-chirping the echo-signal. The output of mixer 104 (i.e., the de-chirped signal) is a sequence of umnodulated pulses at a difference frequency $\Delta F$ (FIG. 4). This output is filtered in a lowpass filter 106 and converted to digital form in an analog-to-digital converter (ADC) 107. The output of ADC 107 is received in a digital signal processor 111, where coherent accumulation of the de-chirped signal is performed, for increasing signal-to-noise ratio. The coherent accumulation is synchronized using chirp pulses from the second order difference product of the forward path chirp signal. The difference product pulses are drawn from tap 105, envelop detected in an amplitude detector 108, and shaped by a comparator 109. The signal obtained as a result of coherent accumulation undergoes FFT processing in an FFT processor 112 and is presented on a display 114. The maximums of the spectrum will correspond to echo signals from CPD sources, and their nominal frequencies will determine, in accordance with Equation 1, the delay time to CPD sources from the point of connection of portable radar unit 9.

An example of one method of locating CPD sources using passive radar unit 9 will now be described in the following steps.

(1) A CPD source to be found is selected from a list of possible candidates (usually cable devices such as amplifiers or taps) identified during the Precision Step above. These candidate devices or the branches or zones in which they are located are pinpointed on a cable plant map.

(2) If only one candidate device is listed or shown, and if the node in which it is located has been calibrated, then one simply goes to the device and fixes the problem. If the node was not calibrated, one must go to the fiber node and perform a calibration as described below. After this calibration, step 2 is repeated.

(3) If several candidate branches or zones are identified, then determine which zone or branch contains the CPD source. In each zone there may be multiple candidate devices that could be the CPD source. Multiple zones being identified does not mean that there are multiple sources of CPD. It simply means that given the current tolerance as specified in System A (determined automatically within computer 2 from the amount and accuracy of the calibration of devices within the node), there are several areas that have the same range from the headend. To determine the correct zone, it is preferred that the following steps be performed—

(a) Find an amplifier that feeds multiple zones with the aid of a cable plant map (the more candidate zones identified, the closer the amplifier will have to be to the fiber node).

(b) Go to the selected amplifier with portable radar unit 9 and find the time delay to the CPD source. If no CPD is shown, then you have likely gone past the problem or it is on a different branch. Thus, find a device closer to the fiber node and repeat step (b).

(c) Based on the amplifier or device selected and the time delay determined in step (b), candidate zones or CPD sources are again identified. If only one zone is identified, then go to step (4) below to find the device within the zone. If multiple zones are again identified, repeat steps (a) and (b) with respect to an amplifier that feeds the newly identified zones.

(4) After the correct zone has been isolated, the next step is to find the device within the zone that is the actual CPD source. This can be accomplished by the following steps—

(a) Connect radar unit 9 to the amplifier or device immediately before the isolated zone;

(b) Determine the time delay to the CPD source using radar unit 9.

(c) Based on the amplifier or device selected in step (a) and the time delay determined in step (b), the location of the CPD is identified from a map or database of locations.

If it appears that the CPD is coming from a device located at the end of the line and the signal splits into paths with multiple devices at similar distances, it may be necessary to disconnect a path in order to determine the CPD location.

After the CPD problem is fixed, it should be confirm with the headend radar unit 1. If the headend radar unit 1 continues to display CPD sources in very close range to the previous problem, it is likely that there were multiple CPD sources. These other sources should be of lesser amplitude than the initial source.

Portable radar unit 9 makes it possible for a single technical specialist in the field to perform the following tasks:

determine precisely in what branch of cable plant 10 (direction) there are CPD sources;

refine directly in the field the range of a CPD source; and confirm the fact that a CPD source has been eliminated after an effort to remove the CPD has been performed.

The effectiveness of CPD detection is mainly determined by the authenticity of the data given on the cable system maps. Such data may include the distances between adjacent cable devices (e.g., amplifiers, multitaps, etc.) and the relative signal velocity in the cable. This data is not always precise and may not reflect changes to the network over time and seasonal variations. As a result, in the preferred embodiment, calibration of the HFC network is absolutely necessary to achieve the most effective CPD detection. The calibration mode of System A is described below.

In both the CPD detection mode and calibration mode, portable radar unit 9 is connected to different connection points along cable plant 10. Examples of more established connection points are shown in FIGS. 14a and 14b. FIG. 14a shows a connection point at a trunk amplifier 116. In particular, the forward path INPUT of radar unit 9 is connected to a test point 117 at the output of a forward path amplifier and the return path INPUT/OUTPUT of radar unit 9 is connected to a test point 118 at the output of a return path amplifier. The same connection arrangement is made at fiber optic node 8 (FIG. 1), at the outputs of the forward and return path RF amplifiers. An alternative connection arrangement would be to connect the forward path INPUT of unit 9 to the output of trunk amplifier 116 (or the output of the fiber optic node), instead of at test point 117. A power blocking probe or filter may be inserted between the return path INPUT/OUTPUT of radar unit 9 and test point tap 118. In the case of a return path combiner at the amplifier or fiber node, the return path INPUT/OUTPUT of radar unit 9 may be connected, separately, to the return inputs of the combiner (usually for CPD detection).

FIG. 14b shows a connection point at a tap 120, such as a directional tap or multitap. In this case, a diplex filter 121 is connected between an output port of tap 120 and radar unit 9. The forward path INPUT of radar unit 9 is connected to a highpass output of diplex filter 121 and the return path INPUT/OUTPUT of radar unit 9 is connected to a lowpass output of diplex filter 121. A power blocking probe or filter also may be inserted between tap 120 and diplex filter 121.

It is to be understood that the preliminary step, precision step, and final step of the CPD detection mode can all be performed by a portable radar unit, similar to radar unit 9. Such a portable unit would contain all of the CPD detection capability and control of headend radar unit 1 necessary to carry out all three CPD detection mode steps. In such case, the portable radar unit would be considered an active radar unit.

Calibration Mode

In the calibration mode, radar unit 9 (FIG. 13) receives the forward path signals at its forward path INPUT in the same manner as it did in the CPD detection mode. The RF double sideband chirp probing signal is selected in tuner 95. The signal is then processed as explained previously. Again, referring to FIG. 13, switch 101 is actuated by a mode control signal from a controller 113 in digital signal processor 111. In the calibration mode, switch 101 switches the output of an amplifier 100 to the OUTPUT of portable radar unit 9. The output of amplifier 100 contains a calibration signal that is transmitted to the headend in the return path spectrum. The calibration signal is an amplified version of the second order difference product of the forward path double sideband chirp signal. It is a sequence of chirp pulses (e.g., signal 50 in FIG. 4). This second order product (comprising chirp pulses) is drawn from tap 99 and amplified in amplifier 100. Simultaneously, these second order chirp pulses are drawn from tap 105, are envelope detected in detector 108 and are shaped in comparator 109. The output of comparator 109 enters controller 113. Controller 113 uses the comparator output to form control signals that blank (by disconnecting amplifier 100) each second chirp pulse. As a result, the calibration signal at the output of switch 101 (i.e., at the OUTPUT of radar unit 9) will have a sequence of chirp pulses exactly the same as the echo signals from the CPD sources, except that every other pulse will be blanked in the calibration signal. This allows radar unit 1 to differentiate between the calibration signal and an echo signal from a CPD source near the calibration test point.

Let us now examine the operation of headend radar unit 1 (FIG. 2) in the calibration mode. Echo signals from CPD sources and the calibration signal from portable radar unit 9 are received at the Return Path INPUT of radar unit 1. These signals undergo the same processing described previously, through bandpass filter 14, low noise amplifier 15, ADC 16, multiplier 28, and lowpass filter 29. In the calibration mode, the output of lowpass filter 29 is fed to a second coherent accumulator 32. A phase inverter 33 inverts the phase of every other pulse (or each second pulse) of the lowpass filter output by 180 degrees. Thus, during coherent accumulation in accumulator 32, the first pulse is subtracted by the second inverted pulse, and so on. Thus, pulses derived from echo signals are not accumulated (they cancel each other out). However, pulses derived from the calibration signal are accumulated because every second pulse was originally blanked (thus, no phase inversion takes place for the calibration pulses). This concept is illustrated in FIG. 15.

Figure 15A:
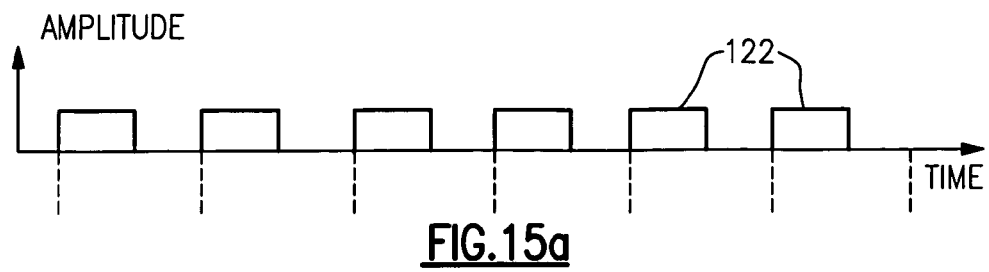
FIG. 15 is a series of time plots illustrating the process of suppressing echo signals from CPD sources while detecting calibration signals in a coherent accumulator of the headend radar unit, in a calibration mode.
Figure 15B:
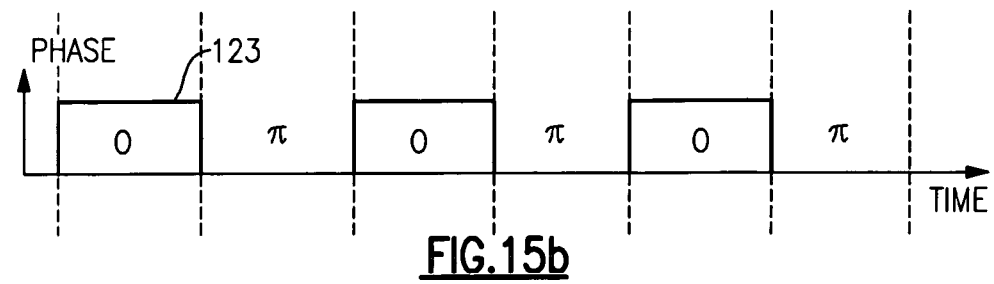
Figure 15C:
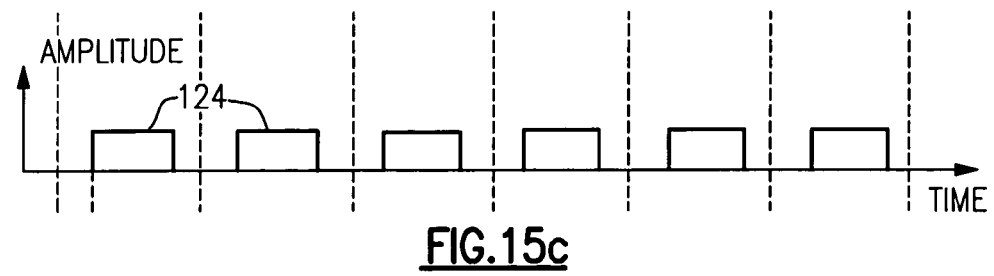
Figure 15D:
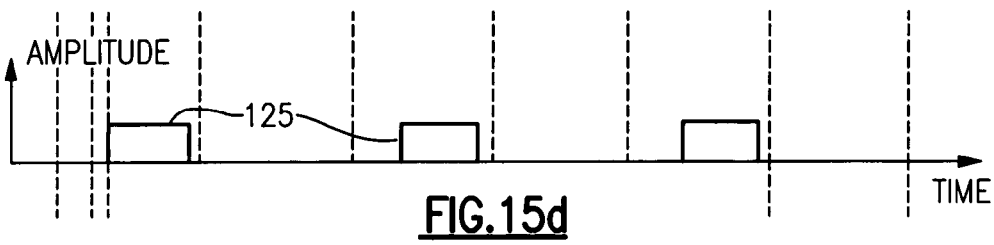

FIG. 15a shows the sequence of coherent chirp double sideband pulses 122 formed by headend radar unit 1. FIG. 15b shows a series of phase shifts 123, created by phase inverter 33, of the signal just before coherent accumulation in accumulator 32. FIG. 15c shows the timing of a sequence of echo pulses 124 from CPD sources. As seen from FIGS. 15b and 15c, each second echo signal pulse will be inverted in accumulator 32 by 180 degrees. FIG. 15d shows the timing of a sequence of calibration pulses 125 from portable radar unit 9. It is evident from FIGS. 15b and 15d that all of the calibration pulses are in phase, and therefore they will not cancel each other out during coherent accumulation in accumulator 32.

Figure 15E:
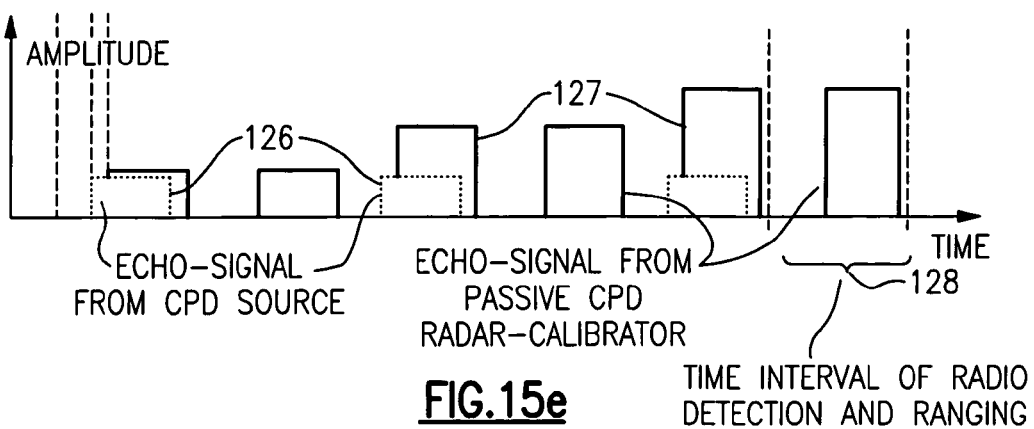

FIG. 15e shows the result of coherent accumulation in accumulator 32, over six periods. An echo signal pulse 126 from a CPD source is present in the first period, it is cancelled out by an inverted pulse in the second period, a third pulse 126 appears in the third period, it is cancelled out by an inverted pulse in the fourth period, a fifth pulse 126 appears in the fifth period, and it is cancelled out in the sixth period. The result is a zero accumulation of pulses from a CPD echo signal. In FIG. 15e, a calibration pulse 127 is present in the first period, it remains in the second ("blank") period, it is accumulated with a second calibration pulse in the third period, the accumulation remains in the fourth period, the accumulation is accumulated with a third calibration pulse in the fifth period, and the total accumulation of calibration pulses is present in the sixth period. Thus, the CPD echo pulses are suppressed and the calibration pulses are accumulated in accumulator 32 (in the radio detection and ranging time interval). With this method, there is a high probability that the parameters (e.g., time delay) of the calibration signal will be revealed and measured, without interference from CPD echo signals. This method substantially increases the accuracy of calibration.

Figure 16:
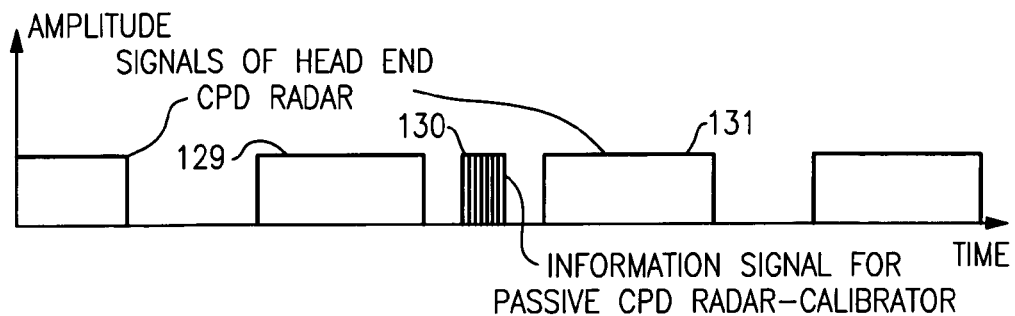
FIG. 16 is a time-domain signal diagram illustrating the placement of an information signal between the probing signal pulses transmitted from the headend radar unit to the portable passive CPD radar-calibrator unit.

After the calibration signal has been revealed and measured, as described above, headend radar unit 1 sends an acknowledgment of this to portable radar unit 9. That is, radar unit 1 sends a confirmatory information signal to radar unit 9. This information signal is formed by controller 37 with the aid of DDS 36 at a frequency of 5 MHz, in the interval between the chirp pulses (See FIG. 16). FIG. 16 illustrates this by showing an information signal 130 inserted in the interval between double sideband chirp pulses 129 and 131 from headend radar unit 1. The information signal may also contain the current time, the Node number, and the measured parameters of the calibration signal (e.g., time delay and amplitude). The latter bit of information allows the operator of portable radar unit 9 to view, in the field, the parameters of the calibration signal as measured by headend radar unit 1. Regular amplitude modulation can be used for the transmission of this and similar information, since the transmission channel is immune to intensive interference.

Figure 17:
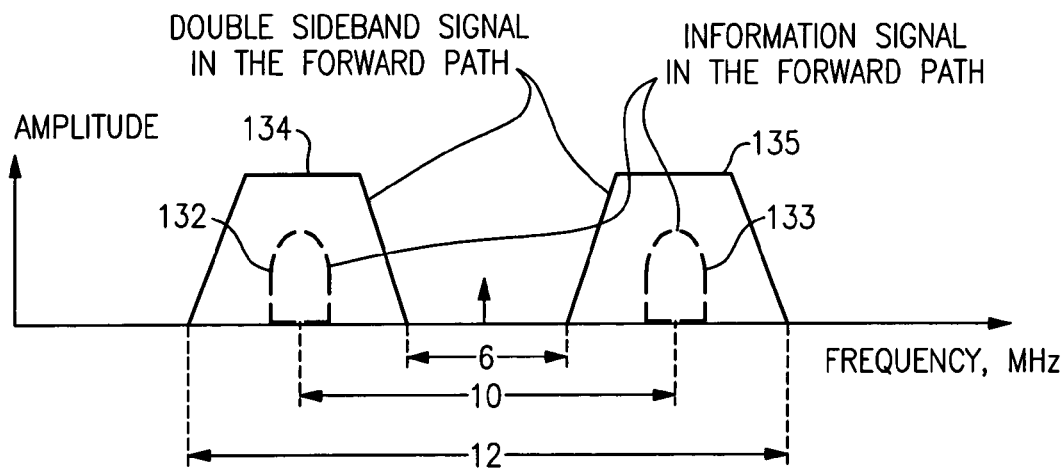
FIG. 17 is a spectrum plot of a double sideband modulated information signal contained within the spectrum a double sideband modulated RF probing signal, as transmitted from the headend radar unit to the portable passive radar-calibrator unit.

FIG. 17 shows a spectrum of information signal 130 at the output of upconverter 22. Signal 130 has a lower sideband 132 and an upper sideband 133, as a result of balanced modulation in mixer 23. Sidebands 132 and 133 fall within the spectrum of the sidebands 134 and 135, respectively, of the RF chirp signal. Sidebands 132 and 133 are separated, center-to-center, by 10 MHz.

Figure 18:
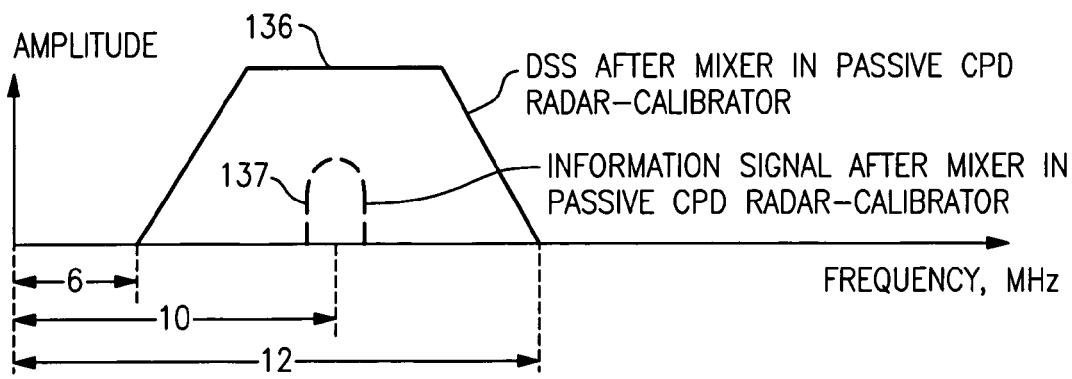
FIG. 18 is a spectrum plot of the second order difference products of the information signal and probing signal of FIG. 17, generated in the portable passive radar-calibrator unit.

Referring to FIG. 13, the RF double sideband chirp signal and information signal are received by portable radar unit 9. FIG. 18 shows a spectrum 136 of the second order difference product of the double sideband chirp signal (i.e., the output of bandpass filter 98 in FIG. 13). A spectrum 137 of the information signal is also shown within spectrum 136. The information signal is detected in amplitude detector 108 and, after shaping in comparator 109, enters a data receiver 110. The information about the Node number and calibration signal parameters measured at the headend are stored in controller 113 and displayed on display 114. As a result, the operator of portable radar unit 9 knows, in the field, that the calibration of the current test point has been performed successfully and registered at the headend and that he or she can move on to calibrate the next point.

The calibration process allows for updating electronic maps and network device databases concerning the HFC network. Through calibration, a calculated time delay for a device is replaced by a measured time delay, thereby increasing the accuracy and speed of the CPD detection mode. At a minimum, the fiber node needs to be calibrated before one should go into the field to find CPD sources. In an HFC network, the majority of the delay (70-90%) may be due to the optical fiber. Therefore, before accurate results can be obtained, one needs to determine a time delay between the headend and the fiber node. In addition, it is preferred that two other points within a node be calibrated. Two such other points may be an amplifier near the end of cable plant 10 and an amplifier near the mid-point between the node and the end of cable plant 10. If a choice needs to be made between an amplifier closer to the node or closer to the end of cable plant 10, the device closer to the node should be selected. After these points are calibrated, further calibration becomes a matter of preference. If acceptable results are achieved without further calibration, then it may not be necessary to calibrate additional devices. If there seems to be some uncertainty with map distances or accuracy, then one might benefit by further calibration.

Referring again to FIG. 16, information signal 130 may also be employed in the CPD detection mode of portable radar unit 9. In the detection mode, information signal 130 is transmitted and received in the manner as already described for the calibration mode. In the detection mode, signal 130 may contain amplitude and time delay parameters of CPD sources detected by headend radar unit 1. This information is displayed on display 114 of portable radar unit 9 (FIG. 13). This allows the operator of radar unit 9 to view the headend results which, in some cases, may be more accurate than the result of radar unit 9. Viewing the headend results is useful for checking if the source of CPD was properly identified and fixed. It also is used in situations when a particular CPD signal is distorted with parasitic AM modulation, or while searching for CPD sources at the split ends of the lines.

Headend radar unit 1 connects to each node in the HFC network in a sequential (one at a time) and cyclic manner. In the preferred mode of operation, it cycles through the nodes continuously, so that the nodes are constantly monitored for CPD problems over the course of a day, week, month and year. This operation is performed with the aid of computer 2 and return path switch 3 (FIG. 1).

When a particular node is being calibrated in the field, the calibration may be delayed until headend radar unit 1 has cycled through to and connects with the node under calibration. This delay period depends, of course, on the number nodes to which unit 1 connects and the time required by unit 1 to process signals at a node. For example, if the double sideband chirp pulse has a duration of 3 msec and the number of accumulated pulses is 32, and taking into account the speed of a contemporary computer, the processing time for one node is about 200 msec. The average number of nodes for one headend (or HUB) is about 50-100. Therefore, the maximum time period for headend radar unit 1 to return to the node under calibration should not exceed about 10-20 seconds. If this time period is not acceptable, or if the time period is greater due to the above factors, then headend unit 1 may be programmed to return to the node or nodes under calibration sooner. In other words, the nodes under calibration are scheduled to be connected to radar unit 1 more frequently than other nodes not scheduled for calibration on a particular day, week or other period.

The entire operation at the headend is accomplished automatically without participation of personnel. All results of calibration are recorded for each node and, upon return from the field, the technician reports to the administrator of the System, the points in the cable plant where the calibrations were made, in what sequence the calibrations were made, and when the calibrations were made. The administrator then enters the results of calibration into an appropriate database, including the measured values of time delay in the calibration mode and the identities of the corresponding devices where the calibrations were performed. In an alternative embodiment, the results of calibration are communicated automatically from portable radar unit 9 to headend radar unit 1, where the information is detected, converted to digital form, and stored in an appropriate database. The results of calibration may be further used to automatically update electronic maps of the HFC network which are usually generated from a map database.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. An apparatus for pinpointing a CPD source in a CATV network that carries a plurality of TV program signals in a forward path frequency band and return path signals in a return path frequency band, said apparatus comprising:
   (a) a first input for receiving the plurality of TV program signals from the CATV network;
   (b) a CPD generator coupled to said first input and configured to generate a plurality of intermodulation products from the plurality of TV program signals, for use as a reference signal;
   (c) a second input for receiving the return path signals from the CATV network, the return path signals including intermodulation products of the plurality of TV program signals created by the CPD source in the CATV network;
   (d) a first time delay unit coupled to said CPD generator to receive the reference signal, said first time delay unit being adapted to delay the reference signal and create a delayed reference signal;
   (e) a correlator coupled to said first time delay unit to receive the delayed reference signal and coupled to said second input to receive the intermodulation products created by the CPD source, said correlator being adapted to perform a cross-correlation of the delayed reference signal with the intermodulation products created by the CPD source and produce a cross-correlation function; and
   (f) a processor coupled to said correlator to receive the cross-correlation function, said processor being adapted to determine a time delay associated with the CPD source based on the cross-correlation function, whereby the time delay associated with the CPD source is used in pinpointing the CPD source.

2. The apparatus of claim 1, wherein the CATV network includes a fiber optic portion having a time delay associated therewith, and wherein said first time delay unit is adapted to delay the reference signal by an amount that is associated with the time delay of the fiber optic portion.

3. The apparatus of claim 2, wherein said first time delay unit is adapted to delay the reference signal by an amount that is substantially equal to the time delay of the fiber optic portion.

4. The apparatus of claim 1, further comprising means for determining an approximate time delay associated with the CPD source using a probing signal, and wherein said first time delay unit is adapted to delay the reference signal by an amount that is associated with the approximate time delay.

5. The apparatus of claim 1, wherein said first time delay unit includes a delay line.

6. The apparatus of claim 1, wherein said first time delay unit includes a variable delay line which delays the reference signal and creates the delayed reference signal, the variable delay line being coupled to said processor to receive a control signal generated by said processor, said processor being adapted to control the time delay produced by the variable delay line by means of the control signal.

7. The apparatus of claim 1, wherein said correlator includes
- a plurality of incremental time delay units coupled to said first time delay unit for receiving the delayed reference signal and generating a plurality incrementally delayed reference signals;
- a plurality of multipliers coupled to said plurality of incremental time delay units, respectively, for receiving the plurality of incrementally delayed reference signals, respectively, each of said plurality of multipliers being further coupled to said second input for receiving the intermodulation products created by the CPD source, such that each of the plurality of incrementally delayed reference signals is multiplied by the intermodulation products to produce a plurality of multiplied outputs; and
- a plurality of integrators coupled to said plurality of multipliers, respectively, for receiving the plurality of multiplied outputs, respectively, said plurality of integrators being adapted to integrate the plurality of multiplied outputs, respectively, and produce a corresponding plurality of integrated outputs.

8. The apparatus of claim 1, further comprising a filter, coupled between said second input and said correlator, for filtering said return path signals received from said second input, said return path signals further including a plurality of service signals defined by an energy spectrum, said filter having a frequency response that substantially matches and is substantially complementary to the energy spectrum of the plurality of service signals, such that the plurality of service signals are substantially suppressed by said filter.

9. A method of pinpointing a CPD source in a CATV network that carries a plurality of TV program signals in a forward path frequency band and return path signals in a return path frequency band, said method comprising the steps of:
- (a) receiving the plurality of TV program signals from the CATV network;
- (b) generating a plurality of intermodulation products from the plurality of TV program signals, for use as a reference signal;
- (c) receiving the return path signals from the CATV network, the return path signals including intermodulation products of the plurality of TV program signals created by the CPD source;
- (d) delaying the reference signal to create a time delayed reference signal;
- (e) cross-correlating the time delayed reference signal with the intermodulation products created by the CPD source to produce a cross-correlation function; and
- (f) determining a time delay associated with the CPD source based on the cross-correlation function, whereby the time delay associated with the CPD source is used in pinpointing the CPD source.

10. The method of claim 9, wherein the CATV network includes a fiber optic portion having a time delay associated therewith, and wherein said step (d) includes delaying the reference signal by an amount that is associated with the time delay of the fiber optic portion.

11. The method of claim 9, wherein the CATV network includes a fiber optic portion having a time delay associated therewith, and wherein said step (d) includes delaying the reference signal by an amount substantially equal to the time delay of the fiber optic portion.

12. The method of claim 9, further comprising the step of determining an approximate time delay associated with the CPD source using a probing signal, and wherein said step (d) includes delaying the reference signal by an amount that is associated with the approximate time delay.

13. The method of claim 9, further comprising the step of filtering said return path signals received in step (c), said return path signals further including a plurality of service signals defined by an energy spectrum, said filtering step includes
- (i) generating a frequency response that substantially matches and is substantially complementary to the energy spectrum of the plurality of service signals, and
- (ii) substantially suppressing the plurality of service signals in accordance with the frequency response.

14. A method of calibrating a CATV network between a reference point and a calibration point, the CATV network having a forward path frequency band and a return path frequency band and containing a source of CPD at or near the calibration point, said method comprising the steps of:
- (a) transmitting from the reference point a probing signal in the forward path frequency band of the CATV network, the source of CPD producing an intermodulation product of the probing signal that represents a distortion signal having a spectrum within the return path frequency band and characterized by a first sequence of pulses;
- (b) receiving the probing signal at the calibration point;
- (c) generating at the calibration point an intermodulation product of the received probing signal, the intermodulation product representing a reference signal characterized by a second sequence of pulses that corresponds with the first sequence of pulses;
- (d) creating a calibration signal from the reference signal, including suppressing every other pulse of the second sequence of pulses to produce a calibration signal sequence of pulses, the calibration signal having a spectrum within the return path frequency band;
- (e) transmitting from the calibration point the calibration signal in the return path frequency band of the CATV network;
- (f) receiving the calibration signal and the distortion signal at the reference point;
- (g) inverting the phase of every other pulse of the first sequence of pulses of the distortion signal, received in step (f), to produce a distortion signal sequence of pulses; and
- (h) accumulating the pulses of the distortion signal sequence of pulses and the pulses of the calibration signal sequence of pulses, such that distortion signal pulses substantially cancel each other out due to the phase inversion of every other pulse and the calibration signal pulses substantially accumulate because they are in-phase, whereby the calibration signal is detected without substantial interference from the distortion signal.

15. The method of claim 14, wherein said step of creating a calibration signal includes amplifying the reference signal.

16. The method of claim 14, wherein the reference point is a headend of the CATV network.

17. An apparatus for pinpointing a CPD source in a CATV network that carries a plurality of TV program signals in a forward path frequency band and return path signals in a return path frequency band, said apparatus comprising:
 (a) a first input for receiving the plurality of TV program signals from the CATV network;
 (b) a CPD generator coupled to said first input and configured to generate a plurality of intermodulation products from the plurality of TV program signals received from said first input, for use as a reference signal;
 (c) a second input for receiving the return path signals from the CATV network, the return path signals including intermodulation products of the plurality of TV program signals created by the CPD source and a plurality of service signals defined by an energy spectrum;
 (d) a filter, coupled to said second input, for filtering the return path signals received from said second input, said filter having a frequency response that substantially matches and is substantially complementary to the energy spectrum of the plurality of service signals, such that the plurality of service signals are substantially suppressed by said filter;
 (e) a correlator coupled to said CPD generator to receive the reference signal and coupled to said filter to receive the intermodulation products created by the CPD source, said correlator including a first time delay unit being adapted to delay the reference signal by a predetermined amount, said correlator being adapted to perform a cross-correlation of the delayed reference signal with the intermodulation products created by the CPD source and produce a cross-correlation function; and
 (f) a processor coupled to said correlator to receive the cross-correlation function, said processor being adapted to determine a time delay associated with the CPD source based on the cross-correlation function, whereby the time delay associated with the CPD source is used in pinpointing the CPD source.

\* \* \* \* \*